US012695201B1

(12) United States Patent
Yao

(10) Patent No.: US 12,695,201 B1
(45) Date of Patent: Jul. 28, 2026

(54) WAVEGUIDE-FED ULTRA WIDEBAND HORN ANTENNA ARRAY FOR E-BAND AUTOMOTIVE RADAR APPLICATION

(71) Applicant: Oculii Corp., Beavercreek, OH (US)

(72) Inventor: Jun Yao, Wesley Chanpel, FL (US)

(73) Assignee: Oculii Corp, Beavercreek, OH (US)

( * ) Notice: Subject to any disclaimer, the term of this patent is extended or adjusted under 35 U.S.C. 154(b) by 397 days.

(21) Appl. No.: 17/945,379

(22) Filed: Sep. 15, 2022

(51) Int. Cl.
| | |
|---|---|
| *H01Q 13/02* | (2006.01) |
| *G01S 7/03* | (2006.01) |
| *G01S 13/931* | (2020.01) |
| *H01Q 21/00* | (2006.01) |

(52) U.S. Cl.
CPC ............. *H01Q 13/025* (2013.01); *G01S 7/03* (2013.01); *G01S 13/931* (2013.01); *H01Q 21/0068* (2013.01)

(58) Field of Classification Search
CPC .... H01Q 13/025; H01Q 21/0068; G01S 7/03; G01S 13/931
See application file for complete search history.

(56) References Cited

U.S. PATENT DOCUMENTS

| | | | | |
|---|---|---|---|---|
| 6,727,860 | B1 * | 4/2004 | Svensson | ............... H01Q 21/06 |
| | | | | 333/125 |
| 7,423,604 | B2 * | 9/2008 | Nagai | ................... H01Q 21/064 |
| | | | | 343/786 |
| 7,808,439 | B2 * | 10/2010 | Yang | ...................... H01Q 13/22 |
| | | | | 343/770 |

| | | | | |
|---|---|---|---|---|
| 10,230,171 | B2 * | 3/2019 | Apostolos | .............. H01Q 13/28 |
| 2009/0251362 | A1 * | 10/2009 | Margomenos | ........ G01S 13/931 |
| | | | | 342/175 |
| 2016/0204514 | A1 * | 7/2016 | Miraftab | .............. H01Q 21/005 |
| | | | | 343/731 |
| 2021/0018588 | A1 * | 1/2021 | Akamine | ................ G01S 7/411 |
| 2023/0420857 | A1 * | 12/2023 | Garcia Tejero | ......... G01S 7/027 |

FOREIGN PATENT DOCUMENTS

| | | | | |
|---|---|---|---|---|
| CN | 110021805 A | * | 7/2019 | ................ H01P 3/18 |
| CN | 114156624 A | * | 3/2022 | |

OTHER PUBLICATIONS

CN_110021805_A_I_translate.pdf (Year: 2019).*
CN_114156624_A_I_translate.pdf (Year: 2022).*
Microstrip—Wikipedia.pdf (Year: 2021).*

* cited by examiner

*Primary Examiner* — Yonghong Li
(74) *Attorney, Agent, or Firm* — Maiorana Patent Law, PA

(57) ABSTRACT

An apparatus comprising a first waveguide portion, a second waveguide portion and an attachment. The first waveguide portion may comprise a first half of a waveguide input and a first layer of a two-layer waveguide board. The second waveguide portion may comprise a second half of the waveguide input and a second layer of the two-layer waveguide board. The attachment may be configured to connect the first waveguide portion to the second waveguide portion. The first half of the waveguide input may have a same height as the second half of the waveguide input. The two-layer waveguide board may be configured to implement a waveguide network for an antenna array. A horn antenna aperture for each antenna in the antenna array may be implemented on the first waveguide portion.

19 Claims, 16 Drawing Sheets

WAVEGUIDE-FED ULTRA WIDEBAND HORN ANTENNA ARRAY FOR E-BAND AUTOMOTIVE RADAR APPLICATION

FIELD OF THE INVENTION

The invention relates to radar devices generally and, more particularly, to a method and/or apparatus for implementing a waveguide-fed ultra wideband horn antenna array for e-band automotive radar application.

BACKGROUND

A radio frequency (RF) waveguide is a structure that guides an electromagnetic (EM) wave by restricting the transmission of energy to one direction. Waveguides are designed to guide the EM wave with minimal loss of energy. A typical RF waveguide is implemented as a tunnel with metal surfaces that have a rectangular shape. The cut off frequency of the EM wave that propagates inside the waveguide is a property that is controlled by the size of the rectangular tunnel of the waveguide.

In order to achieve a high resolution of data, an automotive radar needs a large antenna array aperture. To implement a multi-input multi-output (MIMO) radar, a sparse array may be implemented with the antennas widely separated from each other. To achieve wide separation for a sparse array of antennas, a long routing trace length is needed. In traditional transmission lines, such as Microstrip, coplanar waveguide (CPW) or substrate-integrated waveguide (SIW), the routing loss can be a significant amount, which will directly reduce a detection range and accuracy of the antenna array. At radar frequency, the loss in a waveguide is typically 1/10 of the traditional transmission lines.

Microstrip and CPW transmission lines also suffer from radiation at bending sections. Waveguides have almost no radiation outside of the air tunnel. Since a routing trace is on the same side of the antenna array, any radiation from the trace will distort the antenna pattern and downgrade radar beam calibration.

Conventional waveguide designs for antenna arrays have shortcomings. Slot antenna on gap waveguides have a narrow frequency bandwidth with relatively low radiation efficiency. Horn antenna in Low-Temperature Co-fired Ceramic (LTCC) waveguides require multiple layers of LTCC, which has a high cost.

It would be desirable to implement a waveguide-fed ultra wideband horn antenna array for e-band automotive radar application.

SUMMARY

The invention concerns an apparatus comprising a first waveguide portion, a second waveguide portion and an attachment. The first waveguide portion may comprise a first half of a waveguide input and a first layer of a two-layer waveguide board. The second waveguide portion may comprise a second half of the waveguide input and a second layer of the two-layer waveguide board. The attachment may be configured to connect the first waveguide portion to the second waveguide portion. The first half of the waveguide input may have a same height as the second half of the waveguide input. The two-layer waveguide board may be configured to implement a waveguide network for an antenna array. A horn antenna aperture for each antenna in the antenna array may be implemented on the first waveguide portion.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
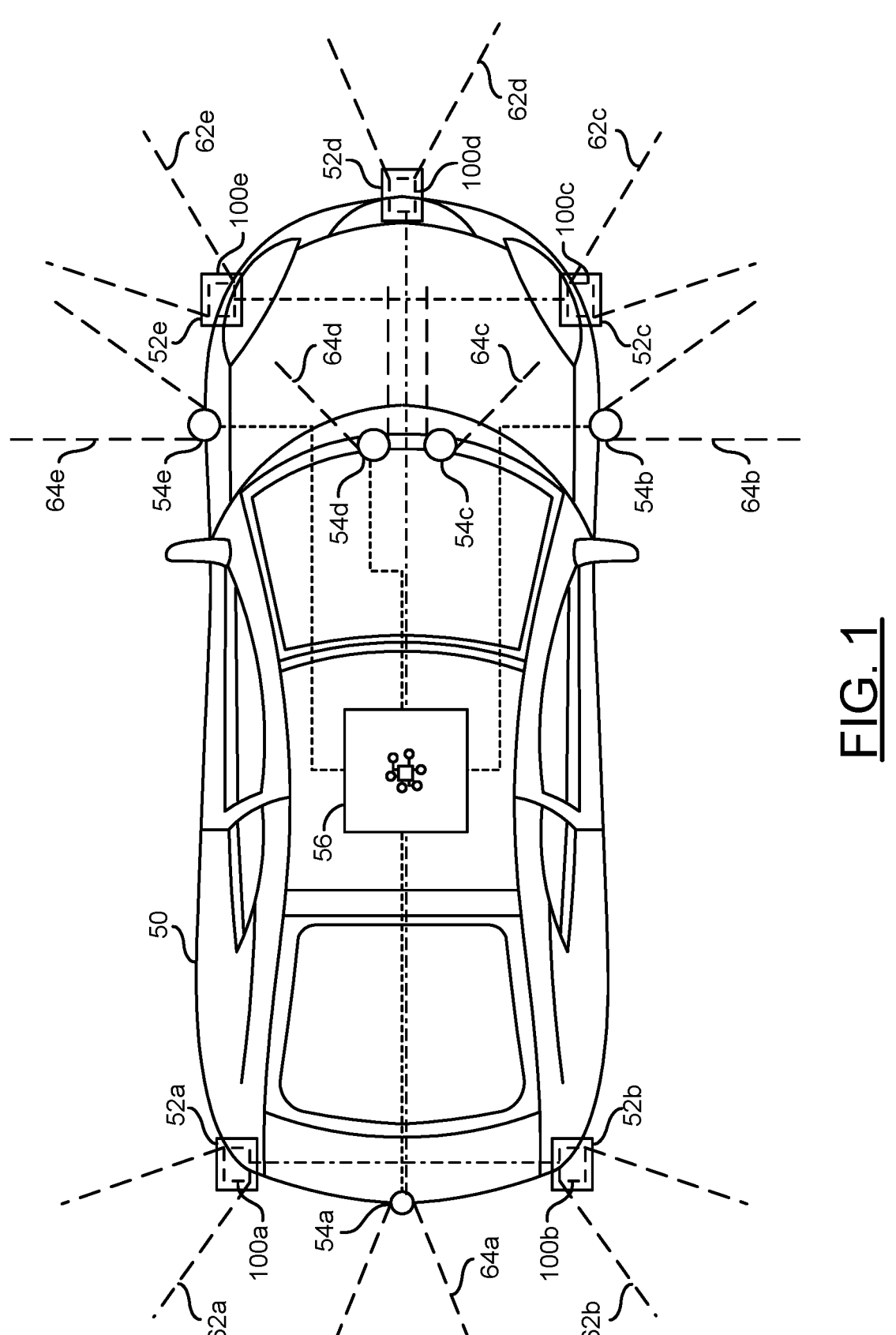
FIG. 1 is a diagram illustrating an embodiment of the present invention implemented in a vehicle.

Embodiments of the present invention include providing a waveguide-fed ultra wideband horn antenna array for e-band automotive radar application that may (i) implement a waveguide as a routing trace to compensate for electromagnetic losses in a long routing length, (ii) implement a sparse array of antennas with wide separation, (iii) implement a waveguide-fed horn integrated into a two layer board, (iv) achieve high radiation efficiency in an ultra wide bandwidth for more than 10 GHZ, (v) be adaptable for short range and long range radar applications, (vi) provide adjustable amplitude and phase for each radiation element, (vii) comprise a two piece design with an air gap for a low-cost mass production fabrication, (viii) provide a waveguide network for an antenna array that is low loss and has low radiation, and/or (ix) be implemented as one or more integrated circuits.

Embodiments of the present invention may be configured to implement an antenna array comprising a waveguide as a routing trace. A large antenna array aperture may be implemented in order to achieve a high resolution of data. For example, the antenna array may be implemented for an automotive radar. The antenna array may be a sparse antenna array configured as a multi-input multi-output (MIMO) radar. To achieve a wide separation for the sparse array of antennas, a long routing trace length may be implemented. The waveguide may be configured to compensate for electromagnetic (EM) losses that may occur in a long routing length. The waveguide implemented may provide a low loss and low radiation tracing route for an antenna array.

Embodiments of the present invention may be configured to be implemented with a low overall fabrication cost. For example, mass production in an automotive application may become expensive when millions of units are sold. To keep overall fabrication costs low, the antenna array may be integrated as a two-piece waveguide board. In an example, the waveguide board may provide a waveguide network for an E-band antenna array (e.g., operating at radio frequencies from approximately 60 GHz-90 GHz in the EM spectrum). Embodiments of the present invention may be modifiable for long range radar detection or short range radar detection. The integrated antenna array may enable a wide operation frequency band to overcome high fabrication and assembly to ensure a high radiation efficiency at a predefined range of detection frequencies.

Embodiments of the present invention may be configured as an ultra-wide band (UWB) waveguide-fed horn antenna array. The waveguide-fed horn antenna array may be configured to operate with a bandwidth of more than 10 GHz. Embodiments of the present invention may be integrated into the two-piece waveguide board. A number and/or arrangement of radiation elements in the antenna array may be adjusted to select between long range and/or short range applications. A waveguide feeding network may be implemented to control phase/amplitude of each of the radiation elements in the antenna array in order to achieve a directional beam and low side lobe.

Referring to FIG. 1, a diagram illustrating an embodiment of the present invention implemented in a vehicle is shown. A top down view of a vehicle 50 is shown. In the example shown, the vehicle 50 may be a car. In some embodiments, the vehicle 50 may be a truck, an ATV, an airplane, a drone, etc. In one example, the vehicle 50 may be an electric vehicle (EV). In another example, the vehicle 50 may be a hybrid electric vehicle. In yet another example, the vehicle 50 may be an internal combustion engine (ICE) vehicle. The type of the vehicle 50 may be varied according to the design criteria of a particular implementation.

The vehicle 50 may comprise a number of blocks (or circuits) 52a-52e, a number of blocks (or circuits) 54a-54e and/or a block (or circuit) 56. The circuits 52a-52e may each implement a radar sensor. The circuits 54a-54e may each implement a camera system. The circuit 56 may implement a processor. The circuits 52a-52e may each comprise a respective one of a number of blocks (or circuits) 100a-100e. The circuits 100a-100e may each implement an apparatus (or device). While the radar sensors 52a-52e and the camera systems 54a-54e are shown, the vehicle 50 may comprise more or fewer of the radar sensors 52a-52e and/or the camera systems 54a-54e. In some embodiments, the vehicle 50 may comprise multiple implementations of the processor 56. The vehicle 50 may comprise other components (not shown). The number, type and/or arrangement of the components of the vehicle 50 may be varied according to the design criteria of a particular implementation.

The radar sensors 52a-52e may each be configured to determine a proximity and/or location of objects/obstacles around the vehicle 50. The radar sensors 52a-52e may be configured as long-range and/or short-range sensors. The radar sensors 52a-52e may be configured to generate a radar signal, which may be reflected back to the radar sensors 52a-52e by the objects near the vehicle 50.

Pairs of dashed lines 62a-62e are each shown extending from a respective one of the radar sensors 52a-52e. The pairs of dashed lines 62a-62e may represent a radio frequency pattern emitted by the respective radar sensors 52a-52e. The shape, intensity and/or direction of the radio frequency patterns 62a-62e may determine a detection range of the radar sensors 52a-52e. The radar sensors 52a-52e are implemented at various locations around the vehicle 50. The radio frequency patterns 62a-62e may be generally emitted all around the vehicle 50 in order to capture data in all directions from the vehicle 50. The radio frequency patterns 62a-62e may have a range of approximately 200 meters to 450 meters, with a 150 degree azimuth field of view and a 45 degree elevation field of view. The particular range of the radio frequency patterns 62a-62e may be varied according to the design criteria of a particular implementation.

The apparatuses 100a-100e may each implement an antenna array and/or waveguide network. The antenna array and/or waveguide network implemented by the apparatuses 100a-100e may enable a sparse array configured to provide a high resolution of data. In an example, the apparatuses 100a-100e may each be configured to generate a dynamic waveform that uses artificial intelligence to learn from and/or adapt to the environment near the vehicle 50. The sparse array implemented by the apparatuses 100a-100e may enable a high resolution of data to be acquired with a low module cost. The apparatuses 100a-100e may be configured to receive the high resolution of data while consuming between 3 watts to 10 watts of power. Details of the antenna array and/or waveguide network implemented by the apparatuses 100a-100e may be varied according to the design criteria of a particular implementation.

The camera systems 54a-54e may be configured to capture images and/or generate video frames of the environment near the vehicle 50. The video frames generated by the camera systems 54a-54e may be used for computer vision operations to detect objects/obstacles around the vehicle 50. The camera systems 54a-54e may comprise RGB cameras, RGB-IR cameras, stereo cameras, monocular cameras, thermal imaging cameras, etc. The number and/or types of the camera systems 54a-54e implemented may be varied according to the design criteria of a particular implementation.

Pairs of dashed lines 64a-64e are each shown extending from a respective one of the camera systems 54a-54e. The pairs of dashed lines 64a-64e may represent a field of view captured by the camera systems 54a-54e. The fields of view 64a-64e of the camera systems 54a-54e may or may not overlap with the radio frequency patterns 62-62e of the radar sensors 52a-52e. The camera systems 54a-54e are implemented at various locations around the vehicle 50. The fields of view 64a-64e may be generally captured all around the vehicle 50 in order to capture data in all directions from the vehicle 50 (e.g., a 360 degree field of view). The particular range and/or directions of the fields of view 64a-64e may be varied according to the design criteria of a particular implementation.

The processor 56 is shown at a generally central location in the vehicle 50. In an example, the processor 56 may implement a zone processor. The processor 56 may be configured to receive input comprising the output from the radar sensors 52a-52e and/or the video frames generated by the camera systems 54a-54e. In some embodiment, multiple implementations of the processor 56 may be implemented near groups (or clusters) of the radar sensors 52a-52e and/or the camera systems 54a-54e. The location of the processor 56 and/or the number of the radar sensors 52a-52e and/or camera systems 54a-54e that provide data to the processor 56 may be varied according to the design criteria of a particular implementation.

The processor 56 may be configured to process raw data streams generated by the radar sensors 52a-52e, the camera systems 54a-54e and/or other sensors. The processor 56 may be configured to implement deep sensor fusion in order to combine interpretations of the data from the radar sensors 52a-52e with interpretations of the data from the camera systems 54a-54e and/or data inputs from other sensors (not shown) in order to make inferences using multiple sources of data that would not be possible based on one of the data sources alone. In an example, the processor 56 may be configured to interpret the high resolution data generated by the radar sensors 52a-52e. In another example, the processor 56 may be configured to perform computer vision operations on the video frames generated by the camera systems 54a-54e in order to detect objects.

The processor 56 may be configured to implement central compute capabilities that enable high performance without implementing a dedicated processor for each of the radar sensors 52a-52e. Implementing the processor 56 may enable the radar sensors 52a-52e to be implemented at a lower cost because a dedicated processor may not be implemented for each of the radar sensors 52a-52e. The processor 56 may be configured to enable sparsity in the implementation of the radar sensors 52a-52e in order to determine the boundary conditions for a particular resolution of data. The processor 56 may enable the radar sensors 52a-52e to undersample the environment while preventing artifacts, grading lobes and/or false alarms.

The processor 56 may be configured to adaptively modulate the information generated by the radar sensors 52a-52e to enable fewer antennas to be implemented in the antenna arrays of the apparatuses 100a-100e. Instead of processing data from the radar sensors 52a-52e at the edge (e.g., one processor on-board with the same technology node for each of the radar sensors 52a-52e), the sparse data from the radar sensors 52a-52e may be processed by the processor 56. The sparse antenna array implemented by the apparatuses 100a-100e may enable low bandwidth data to be transmitted from the radar sensors 52a-52e to the processor 56. The processor 56 may be configured to expand the resolution of data received from the radar sensors 52a-52e. The processor 56 may be configured to dynamically shift radar processing capabilities around the vehicle 50 on an as-needed basis in response to various detection scenarios. The processor 56 may be configured to implement joint bistatic processing from multiple of the distributed radar sensors 52a-52e to provide a high resolution and/or sensitivity.

Figure 2:
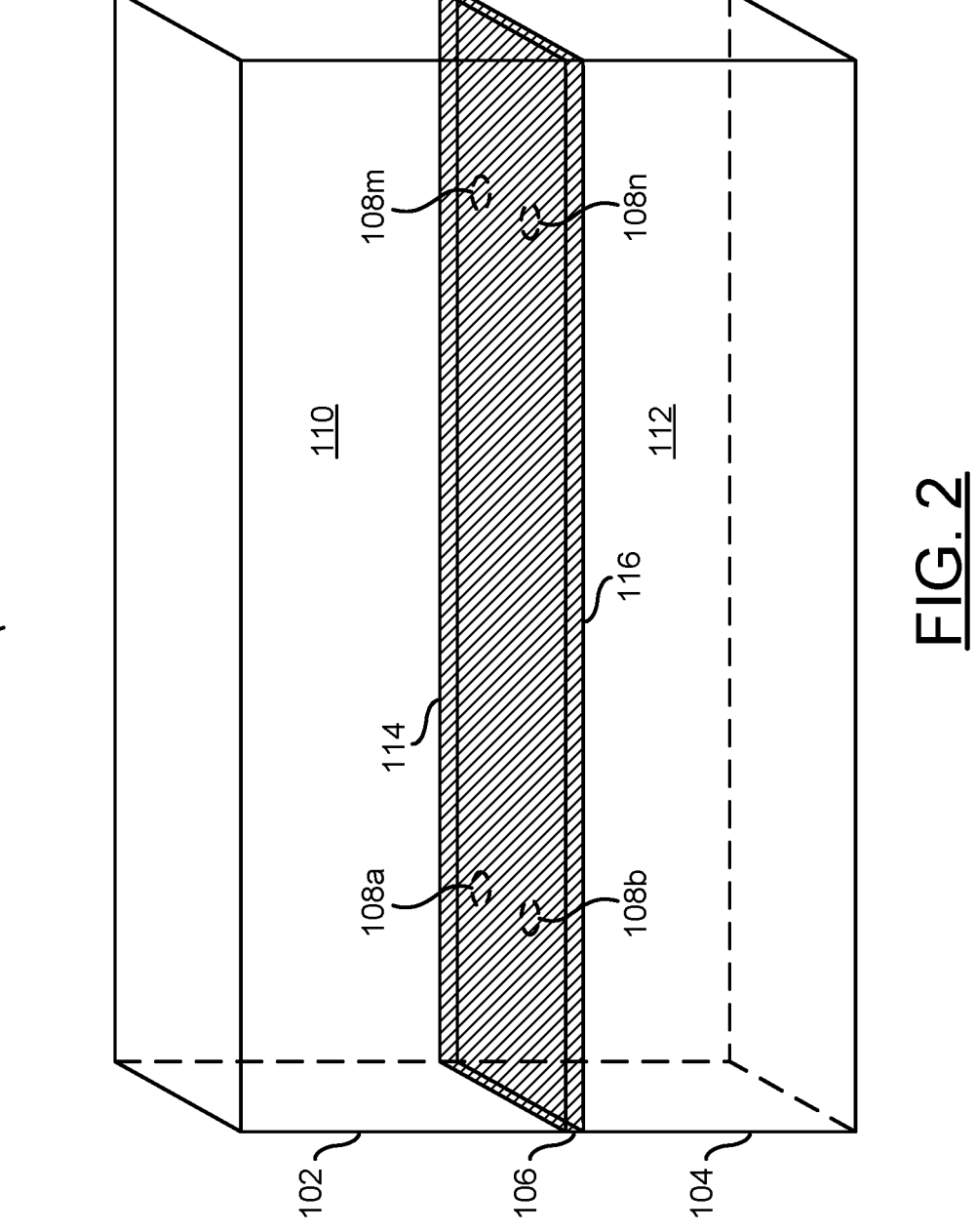
FIG. 2 is a diagram illustrating a two layer embodiment of the present invention.

Referring to FIG. 2, a diagram illustrating a two layer embodiment of the present invention is shown. The apparatus 100 is shown. The apparatus 100 may be a representative example of one of the apparatuses 100a-100e shown in association with FIG. 1. The apparatus 100 may be configured as a waveguide feeding network. The apparatus 100 may enable an adjustment of an amplitude and/or phase of each radiation element in the waveguide feeding network. Adjusting the amplitude and/or phase of each radiation element may enable a high gain, directional beam with a low side lobe to be achieved in an antenna array.

The apparatus 100 may comprise a first portion 102, a second portion 104, an air gap 106, attachments 108a-108n, a first board layer 110 and a second board layer 112. The first portion 102 and the second portion 104 may comprise two pieces of a waveguide. The first portion 102 may be a top piece. The second portion 104 may be a bottom piece. In an example, the air gap 106 may have a tolerance of approximately 1 mil to 2 mil for an air gap in between the first portion 102 and the second portion 104. For example, a cut may be made in the middle of a whole waveguide in order to provide the first portion 102 and the second portion 104 with the air gap 106 in the middle. The apparatus 100 may be configured as a waveguide-fed horn integrated into the two layer board 110-112. The apparatus 100 may be configured to provide an ultra wide bandwidth with high radiation efficiency for more than 10 GHZ.

The apparatus 100 may be designed for mass production. For example, the apparatus 100 may implement a waveguide for each of the radar sensors 52a-52e in the vehicle 50. Dividing a waveguide into two pieces (e.g., the first portion 102 and the second portion 104) may reduce production costs. The first portion 102 may be fabricated with the first board layer 110 and the second portion 104 may be fabricated with the second board layer 112. The first board layer 110 and the second board layer 112 may be fabricated using molding injection with surface plating. The attachments 108a-108n may be configured to attach the first portion 102 to the second portion 104.

The attachments 108a-108n may connect the first portion 102 to the second portion 104. In some embodiments, the attachments 108a-108n may comprise a fastener (e.g., a screw). In the example shown, four fasteners are implemented as the attachments 108a-108n. In some embodiments, the attachments 108a-108n may comprise a conductive glue. In some embodiments, the attachments 108a-108n may comprise a non-conductive glue. Since the air gap 106 is in the middle of the first portion 102 and the second portion 104, an amount of leakage may be limited to a small amount from the bonding gap due to a low current. For example, with the 2 mil thickness air gap 106 between the first portion 102 and the second portion 104, an amount of loss for the apparatus 100 may be similar to an amount of loss in a single-piece waveguide. The type, material and/or the location of the attachments 108a-108n implemented may be varied according to the design criteria of a particular implementation.

The two-layer board 110-112 is shown. The two-layer board 110-112 may implement a two-layer waveguide board. The first portion 102 may comprise the first half 110 of the two-layer waveguide board 110-112. The second portion 104 may comprise the second half 112 of the two-layer waveguide board 110-112. Surfaces 114-116 are shown. The surface 114 may comprise a conductive surface for the first half 110 of the two-layer waveguide board 110-112. The surface 116 may comprise a conductive surface for the second half 112 of the two-layer waveguide board 110-112. In an example, the two-layer board 110-112 may be implemented (e.g., filled) with a first material, and comprise a second material for the surfaces 114-116.

The first portion 102 may be a first waveguide portion. The first portion 102 may comprise a first half of a waveguide input. The second portion 104 may be a second waveguide portion. The second portion 104 may comprise a second half of a waveguide input. In some embodiments, a height of the first portion 102 may be approximately the same height as the second portion 104. In an example, in an ideal assembly for the apparatus 100, the first portion 102 may be connected to the second portion 104 without the air gap 106. If there is no air gap 106, then the height of the first portion 102 may not necessarily be the same height as the second portion 104. In a real world assembly, the presence of the air gap 106 may be unavoidable. Implementing the first portion 102 with the same height as the second portion 104 may limit leakage of the RF energy transmitted in the waveguide.

Figure 3:
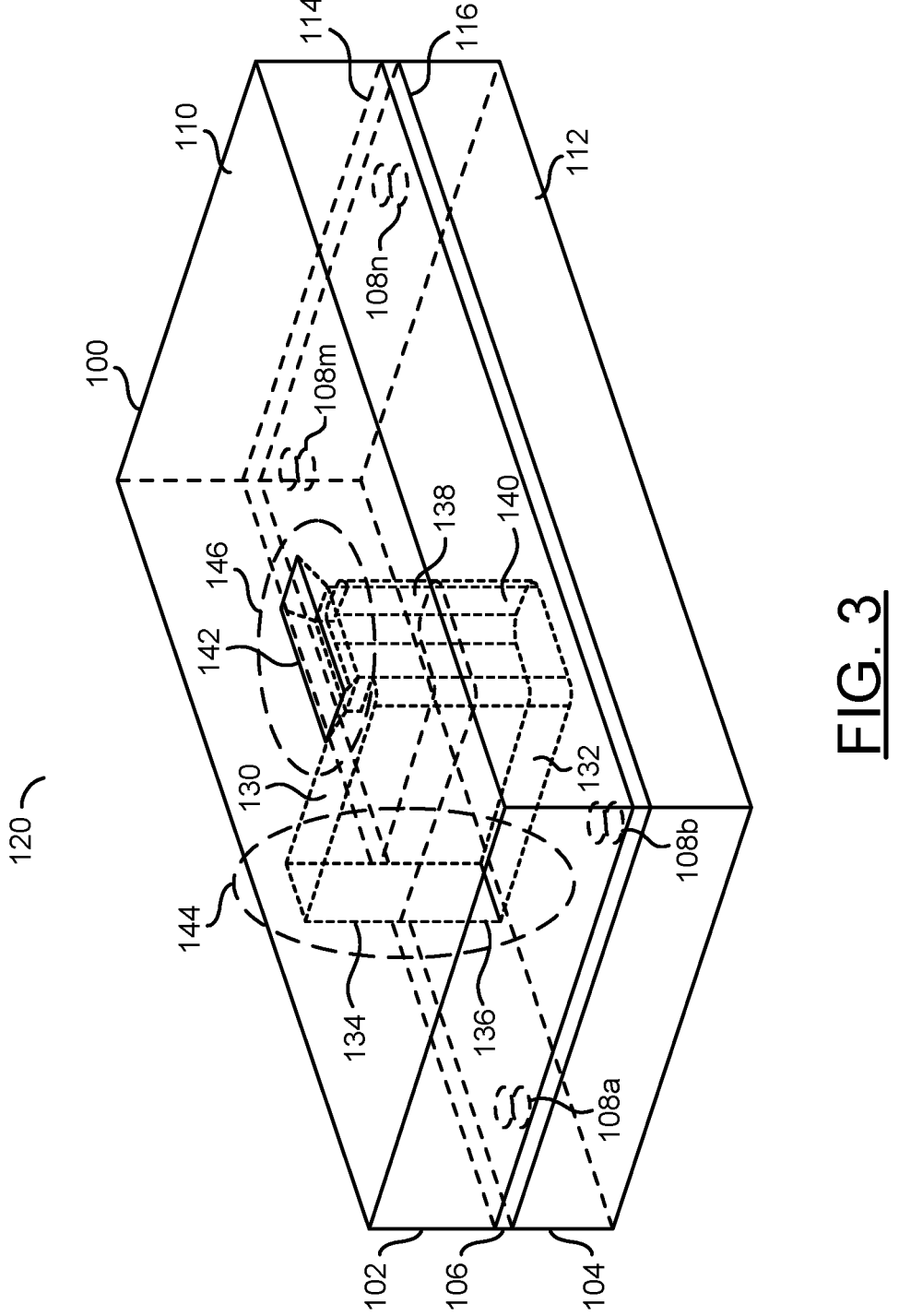
FIG. 3 is a diagram illustrating a three dimensional view of an embodiment of the present invention.

Referring to FIG. 3, a diagram illustrating a three dimensional view of an embodiment of the present invention is shown. A three dimensional view 120 of the apparatus 100 is shown. In the example shown, the apparatus 100 may implement a single element waveguide-fed horn antenna. The first portion 102 is shown above the second portion 104. The air gap 106 is shown in between the first portion 102 and the second portion 104. The two-layer board 110-112 is shown. The attachments 108a-108n are shown connecting the two-layer board 110a-112 together.

From the perspective shown in the 3D view 120, the surface 114 of the first half 110 of the two-layer waveguide board 110-112 may be visible. The surface 116 of the second half 112 of the two-layer waveguide board 110-112 may be implemented on the underside of the first half 110 (e.g., below the air gap 106). In the example shown, the first half 110 and the second half 112 of the two-layer waveguide board 110-112 may have an equal thickness. In some embodiments, the two-layer waveguide board 110-112 may be implemented with the first half 110 and the second half 112 each having a different thickness. For example, the thickness of the first half 110 and the second half 112 may be variable within a tolerance.

The two-layer waveguide board 110-112 may be implemented with an injection material. In an example, the two-layer waveguide board 110-112 may be fabricated using a mold injection. In an example, the two-layer waveguide board 110-112 may be implemented with the injection material comprising a plastic mold injection. The surface 114 and the surface 116 may be implemented with a surface plating (e.g., a metal material). For example, an inside of the two-layer waveguide board 110-112 may be a plastic material fabricated using mold injection for cost savings and the metal plating for the surface 114-116 may enable the two-layer waveguide board to appear and/or operate as two metal boards. The mold injection fabrication process using the injection material (e.g., a polymer) may be metal plated to form the first half 110 with the surface 114 and the second half 112 with the surface 116. The attachments 108a-108n may be configured to attach the first half 110 to the second half 112 to form the two-layer waveguide board 110-112. The air gap 106 may occur between the two-layer waveguide board 110-112 during the fabrication process. In an example, the air gap 106 may be a thickness of approximately 1 mil-2 mil in between the surfaces 114-116.

The first portion 102 may comprise a first waveguide portion 130. The second portion 104 may comprise a second waveguide portion 132. For example, the two-layer waveguide board 110-112 and the waveguide portions 130-132 may implement a waveguide network for an antenna array. The waveguide portions 130-132 may comprise a structure configured to guide an EM wave. The waveguide portions 130-132 may have a generally rectangular shape that is formed together from the first waveguide portion 130 and the second waveguide portion 132. The waveguide portion 130 may be carved out of the first half 110 of the two-layer waveguide board 110-112 with the surface 114 on the inside surface of the waveguide portion 130. The waveguide portion 132 may be carved out of the second half 112 of the two-layer waveguide board 110-112 with the surface 116 on the inside surface of the waveguide portion 132. For example, the waveguide portions 130-132 may extend through the two-layer waveguide board 110-112 and the air gap 106 and may be bounded by the surfaces 114-116.

In an example, the waveguide portions 130-132 may implement an air waveguide. The air waveguide implementation of the waveguide portions 130-132 may have less routing radio frequency loss than a microstrip implementation and/or a CWP trace implementation. The air waveguide implementation of the waveguide portions 130-132 may be configured to compensate for radio frequency losses that may occur from routing traces for the antenna array that may enable a wide separation from each antenna in the antenna array.

The first portion 102 may comprise a first waveguide input 134. The second portion 104 may comprise a second waveguide input 136. The first waveguide input 134 and the second waveguide input 136 may provide a rectangular waveguide feed to the waveguide 130-132. The first waveguide input 134 may have a same size (e.g., thickness) as the second waveguide input 136. For example, a height (e.g., an axis that extends from the second portion 104 to the first portion 102) of the first waveguide input 134 may be the same height as the second waveguide input 136. The apparatus 100 may be implemented with the first waveguide input 134 and the second waveguide input 136 having the same assembly tolerance.

The first portion 102 may comprise a first output structure 138. The second portion 104 may comprise a second output structure 140. The waveguide 130-132 may transmit an EM wave from the first waveguide input 134 and the second waveguide input 136, through the waveguide 130-132 and to the output structure 138-140. The output structures 138-140 may comprise the surfaces 114-116 to form the shape of the output structures 138-140. The output structure 138-140 may provide an output to a horn antenna aperture 142.

The horn antenna aperture 142 is shown connected to the output structure 138-140. The horn antenna aperture 142 for an antenna array may be implemented on the first portion 102. In the example shown, the apparatus 100 may comprise an antenna array comprising a single antenna element. In some embodiments, the antenna array may comprise multiple antenna elements. The horn antenna aperture 142 may be connected to the first output structure 138. A horn antenna aperture may not be connected to the second portion 104.

The horn antenna aperture 142 may comprise a flared waveguide shape. In one example, the horn antenna aperture 142 may comprise a metal material. The horn antenna aperture 142 may be configured to direct RF waves into a beam. The horn antenna aperture 142 may be configured to operate over a wide range of frequencies and/or provide a wide bandwidth. The horn antenna aperture 142 may be configured to transmit RF waves from the waveguide 130-132 and/or receive RF waves for the waveguide 130-132. The horn antenna aperture 142 may be closed at one end (e.g., an end connected to the first portion 102) and flared open at the other end (e.g., flared out from the surface of the first portion 102). RF waves may radiate out from the horn antenna aperture 142 in a narrow beam. In one example, the horn antenna aperture 142 may comprise a general pyramid shape. In another example, the horn antenna aperture 142 may comprise a conical shape. In yet another example, the horn antenna aperture 142 may comprise slots and/or grooves on an inside surface. The size, shape and/or structure of the horn antenna aperture 142 may be varied according to the design criteria of a particular implementation.

A dotted shape 144 is shown. The dotted shape 144 is shown encircling the input portions 134-136. The dotted shape 144 may represent a waveguide feeding. In one example, the waveguide feeding 144 may comprise an input for RF waves to the waveguide 130-132. In another example, the waveguide feeding 144 may comprise an output for RF waves from the waveguide 130-132. The waveguide feeding 144 may comprise the two halves of the input portions 134-136. For example, the first portion 102 may comprise the waveguide input portion 134, which may be a first half of the waveguide feeding input 144 and the second portion 104 may comprise the waveguide input portion 136, which may be a second half of the waveguide feeding input 144. Together, the first input portion 134 and the second input portion 136 may comprise the rectangular waveguide feeding 144. The rectangular shape of the waveguide input 134-136 may feed the RF waves to/from the rectangular shape of the waveguide 130-132. The first portion 102 and the second portion 104 may be connected using the attachments 108a-108n in order to align the first input portion 134 with the second input portion 136 in order to form the rectangular waveguide feeding input 144 for the waveguide network 130-132.

A dotted shape 146 is shown. The dotted shape 146 is shown encircling the horn antenna aperture 142. The dotted shape 146 may represent a waveguide feeding. In one example, the waveguide feeding 146 may comprise an input for RF waves to the horn antenna aperture 142, then to the output structure 138-140 and then to the waveguide 130-132. In another example, the waveguide feeding 146 may comprise an output for RF waves from the waveguide 130-132, to the output structure 138-140 and then out via the horn antenna aperture 142. The waveguide feeding 146 may be implemented on a surface of the first portion 102.

The two-layer waveguide board 110-112 may be separated from a radar printed circuit board (not shown). The radar printed circuit board may be implemented below the second portion 104. For example, the radar printed circuit board may be under the second portion 104 and the horn antenna aperture 142 may be implemented on top of the first portion 102.

Figure 4:
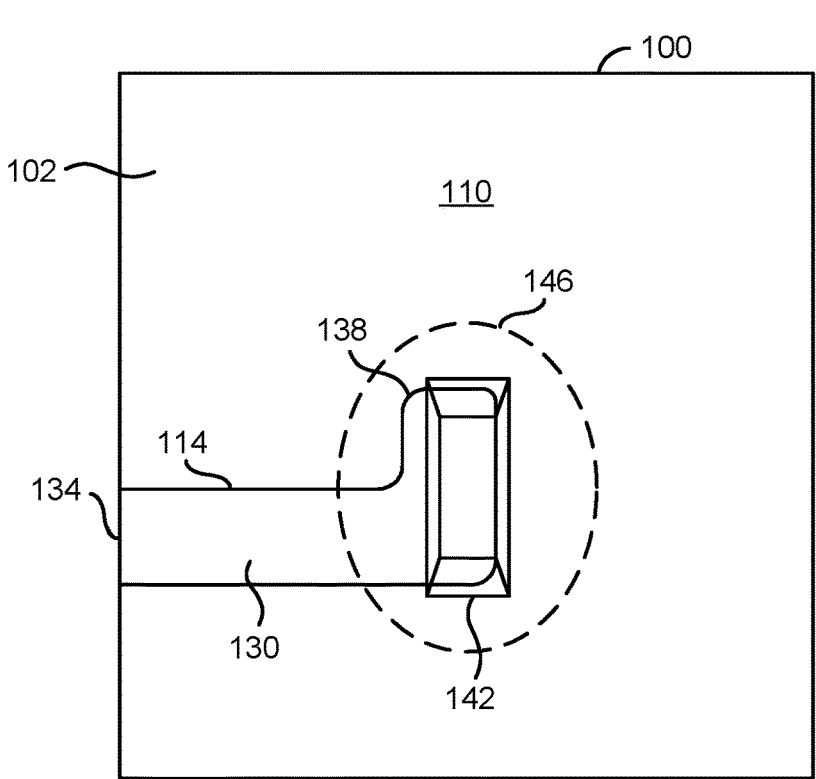
FIG. 4 is a diagram illustrating a top down view of an example embodiment of the present invention.

Referring to FIG. 4, a diagram illustrating a top down view of an example embodiment of the present invention is shown. A top down view 180 of the apparatus 100 is shown. The top down view 180 may provide an alternate view to the three dimensional view 120 shown in association with FIG. 3. In the example shown, the apparatus 100 in the top down view 180 may comprise a single element antenna array.

In the top down view 180 shown, the first portion 102 is shown (e.g., the second portion 104 may be below the first portion 102 and hidden from view). The first portion 102 may comprise the first half 110 of the two-layer waveguide board 110-112 implemented with the polymer material. The first waveguide portion 130 is shown. The inner edges of the first waveguide portion 130 may comprise the metal-plated surface 114. The first waveguide input 134 may provide a feed for the first waveguide portion 130. The first output structure 138 may feed the horn antenna aperture 142. The horn antenna aperture 142 is shown on the first portion 102. The horn antenna aperture 142 may provide the waveguide feed 146 for the apparatus 100.

Figure 5:
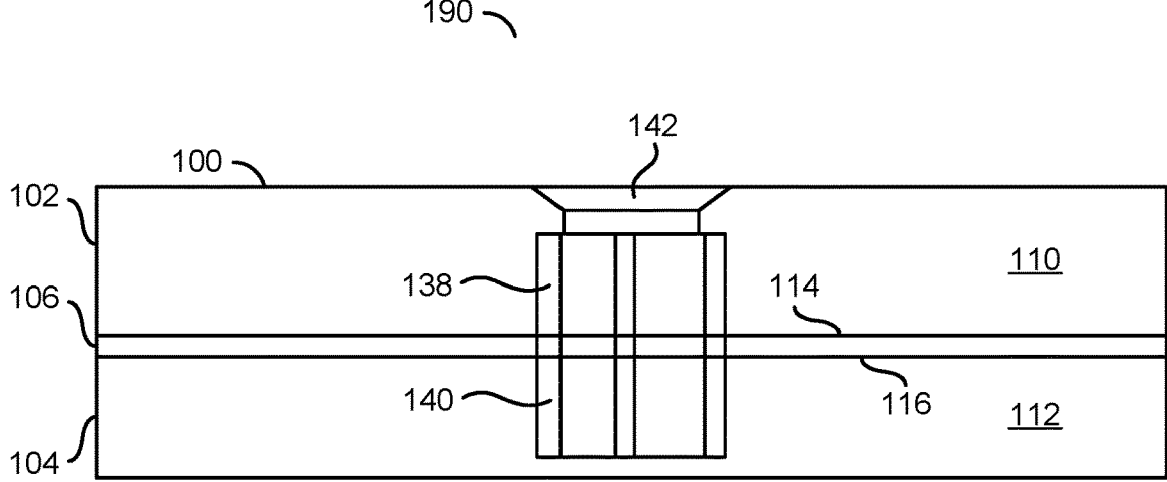
FIG. 5 is a diagram illustrating a side view of an example embodiment of the present invention.

Referring to FIG. 5, a diagram illustrating a side view of an example embodiment of the present invention is shown. A side view 190 of the apparatus 100 is shown. The side view 190 may provide an alternate view to the three dimensional view 120 shown in association with FIG. 3 and the top down view 180 shown in association with FIG. 4. In the example shown, the apparatus 100 in the side view 190 may comprise a single element antenna array.

In the side view 190 shown, the first portion 102, the second portion 104 and the separation layer 106 are shown. The separation layer 106 (e.g., the air gap) may be at the middle of the waveguide (e.g., in between the first portion 102 and the second portion 104). The metal-plated surfaces 114-116 are shown around the separation layer 106. The metal-plating of the surfaces 114-116 may surround the injection molded polymer used to fabricate the first half 110 and the second half 112 of the two-layer waveguide board 110-112. The output structure 138-140 is shown. The output structure 138-140 may provide a path from the waveguide 130-132 to the horn antenna aperture 142. The horn antenna aperture 142 is shown on the first portion 102. For example, the first portion 102 may be implemented with the horn antenna aperture 142 and the second portion 104 may not be implemented with a horn antenna aperture.

Figure 6:
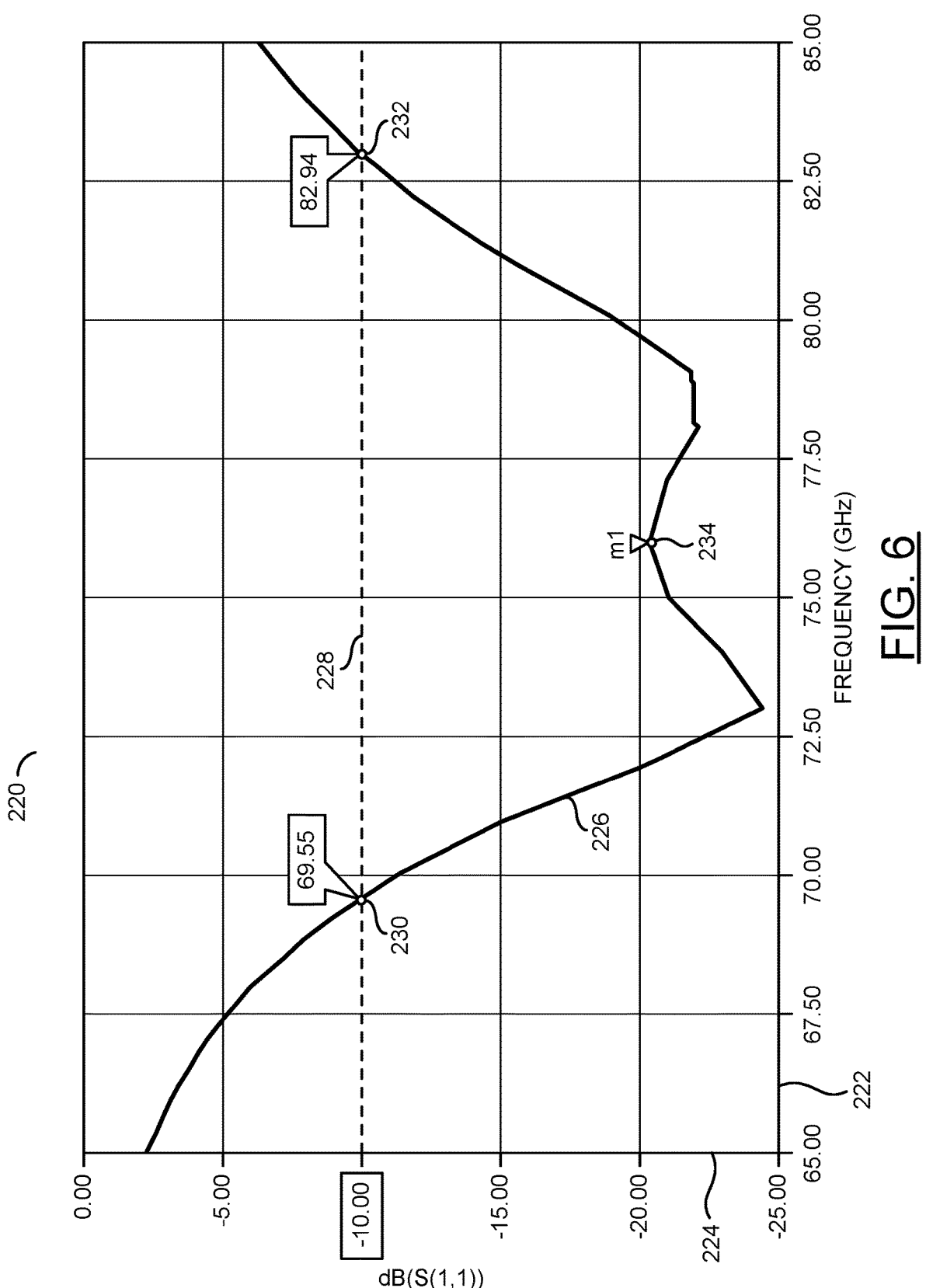
FIG. 6 is a diagram illustrating a reflection coefficient plot for a single element embodiment of the present invention.

Referring to FIG. 6, a diagram illustrating a reflection coefficient plot for a single element embodiment of the present invention is shown. A graph 220 is shown. The graph 220 may illustrate a reflection coefficient response for a single element waveguide-fed horn antenna. In an example, the graph 220 may correspond to the apparatus 100 shown in association with FIGS. 3-5.

The graph 220 may comprise an axis 222 and an axis 224. The axis 222 may comprise an x-axis. The axis 224 may comprise a y-axis. The x-axis 222 may be a measure of frequency. In the example shown, the x-axis 222 may comprise a range of frequency from approximately 65 GHz to 85 GHZ. The y-axis 224 may be a measure of a reflection coefficient. In the example shown, the y-axis 224 may comprise a range reflection coefficients from approximately −25 dB to 0 dB. In an example, the reflection coefficient may provide a relationship between the RF wave at the waveguide feeding 146 and the waveguide feeding 144.

A line 226 is shown on the graph 220. The line 226 may be a reflection coefficient response of the RF wave that may propagate through the waveguide 130-132. A dashed horizontal line 228 is shown. The dashed horizontal line 228 may comprise a reference line for a −10 dB reflection coefficient. In an example, −10 dB may be considered an operational range for the waveguide 130-132. For example, the apparatus 100 may be considered to operate properly when the reflection coefficient 226 is below the reference line 228. The bandwidth of the apparatus 100 may be the range of frequencies that the reflection coefficient 226 is below the reference line 228. The operational range for the apparatus 100 may be varied according to the design criteria of a particular implementation.

A point 230, a point 232 and a point 234 are shown on the reflection coefficient 226. The point 230 and the point 232 may comprise points on the reflection coefficient response 226 that cross the −10 dB reference line 228. The point 234 may comprise a point on the reflection coefficient response 226 that is below the −10 dB reference line 228.

The point 230 may correspond to −10 dB on the y-axis 224 and approximately 69.55 GHz on the x-axis 222. The reflection coefficient response 226 may be above the −10 dB reference line 228 at frequencies below 69.55 GHZ. The point 232 may correspond to −10 dB on the y-axis 224 and approximately 82.94 GHz on the x-axis 222. The reflection coefficient response 226 may be above the −10 dB reference line 228 at frequencies above 82.94 GHZ. The reflection coefficient response 226 may be below the −10 dB reference line 228 in between the points 230-232. In an example, at the point 234, the reflection coefficient may be approximately −20.3738 at a frequency of 76 GHz. In the example shown, the difference between the point 230 and the point 232 may be 13.39 GHz. For example, the single element embodiment of the apparatus 100 may provide a bandwidth of approximately 13 GHZ.

Figure 7:
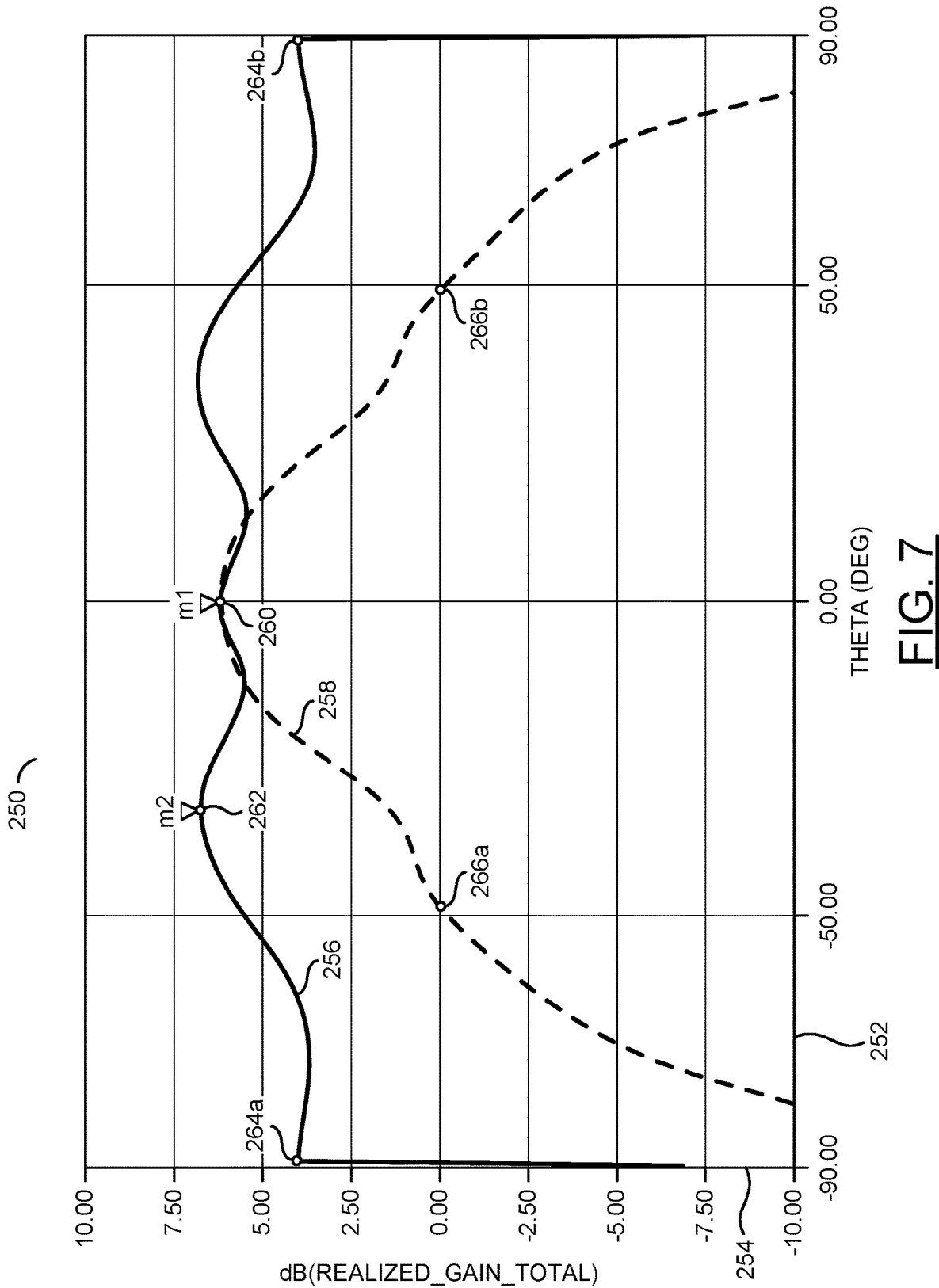
FIG. 7 is a diagram illustrating a radiation pattern plot for a single element embodiment of the present invention.

Referring to FIG. 7, a diagram illustrating a radiation pattern plot for a single element embodiment of the present invention is shown. A graph 250 is shown. The graph 250 may illustrate a radiation pattern for a single element waveguide-fed horn antenna. In an example, the graph 250 may correspond to the apparatus 100 shown in association with FIGS. 3-5.

The graph 250 may comprise an axis 252 and an axis 254. The axis 252 may comprise an x-axis. The axis 254 may comprise a y-axis. The x-axis 252 may be an angle measured in degrees. In the example shown, the x-axis 252 may comprise a range of degrees from approximately −90 degrees to 90 degrees. The y-axis 254 may be a measure of realized total gain measured in decibels. In the example shown, the y-axis 254 may comprise a range of realized total gain from approximately −10 dB to 10 dB. In an example, the gain may provide a relationship between the RF wave at the waveguide feeding 146 and the waveguide feeding 144.

A line 256 and a dotted line 258 are shown on the graph 250. The line 256 may be a gain response at 76 GHz with a phi value of 0 degrees (e.g., the azimuth plane). The dotted line 258 may be a gain response at 76 GHz with a phi value of 90 degrees (e.g., the elevation plane). The lines 256-258 may illustrate an electric field pattern (e.g., an E-field radiation pattern).

A point 260 is shown on the gain response 258. The point 260 may comprise a realized gain value of 6.2677 dB at an angle of 0 degrees. A point 262 is shown on the gain response 256. The point 262 may comprise a realized gain value of 6.7001 dB at an angle of −33 degrees. Points 264a-264b are shown on the gain response 256. The points 264a-264b may at approximately 3.25 dB near the −90 degree and the +90 degree angles, respectively. The radiation pattern of the gain response 256 may drop off beyond −90 degrees and +90 degrees. Points 266a-266b are shown on the gain response 258. The points 266a-266b may at approximately 0 dB near the −50 degree and the +50 degree angles, respectively. The radiation pattern of the gain response 256 may drop off towards −10 dB in the range of −50 degrees to −90 degrees and in the range of +50 degrees and +90 degrees.

The single element antenna implementation of the apparatus 100 may provide a wide E-field pattern. As shown in the graph 250, the E-field pattern may provide approximately a 3 dB bandwidth from be −90 degrees to 90 degrees.

Figure 8:
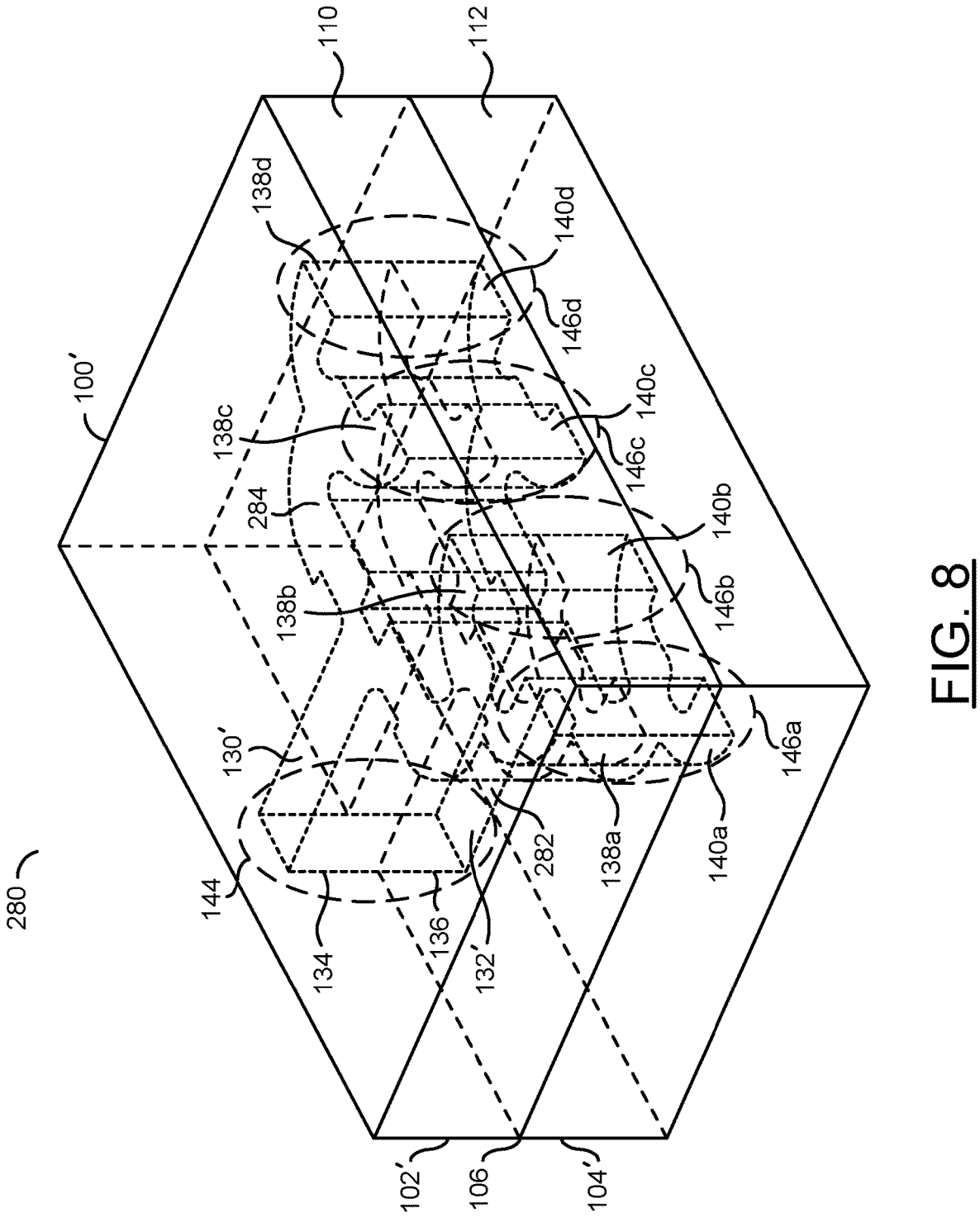
FIG. 8 is a diagram illustrating a three dimensional view of an example embodiment of a 1 by 4 waveguide network.

Referring to FIG. 8, a diagram illustrating a three dimensional view of an example embodiment of a 1 by 4 waveguide network is shown. A three dimensional view 280 of the apparatus 100' is shown. In the example shown, the apparatus 100' may implement a 1 by 4 antenna array feeding network. The first portion 102' is shown above the second portion 104'. The air gap 106 is shown in between first portion 102' and the second portion 104'.

Similar to the single element waveguide-fed horn antenna implementation shown in association with FIG. 3, the apparatus 100' may comprise the two-layer waveguide board 110-112. For simplicity, the attachments 108a-108n and the surfaces 112-114 have been intentionally omitted, but may be implemented similar to the implementation shown in association with FIG. 3. The first portion 102' may comprise the first waveguide portion 130'. The second portion 104' may comprise the second waveguide portion 132'. For example, the two-layer waveguide board 122-124 and the waveguide portions 130'-132' may implement a waveguide network for the 1 by 4 antenna array. The waveguide portions 130'-132' may comprise the structure configured to guide an EM wave. The waveguide portions 130'-132' may have a generally rectangular shape that is formed together from the first waveguide portion 130' and the second waveguide portion 132'. The waveguide portions 130'-132' may be carved out of the polymer material of the two-layer waveguide board 110-112 and may be bounded by the surfaces 112-114.

The first portion 102' may comprise the first waveguide input 134. The second portion 104' may comprise a second waveguide input 136. The first waveguide input 134 and the second waveguide input 136 may provide the rectangular waveguide feed input to the waveguide 130'-132'. The waveguide feeding 144 may comprise an input for RF waves to the waveguide 130'-132'.

In the 1 by 4 waveguide network 130'-132' implemented by the apparatus 100', the waveguide network 130'-132' may comprise a branch 282 and a branch 284. The branches 282-284 may split the waveguide network 130'-132' from the single waveguide feeding input 144 (e.g., the waveguide input 134-136) to four waveguide outputs 146a-146d. The branch 282 may split off the first waveguide portion 130' into two of the first output structures 138a-138b and the second waveguide portion 132' into two of the second output structures 140a-140b. The output structure 138a-140a and the output structure 138b-140b may be separated from each other. The branch 284 may split off the first waveguide portion 130' into two of the first output structures 138c-138d and the second waveguide portion 132' into two of the second output structures 140c-140d. The output structure 138c-140c and the output structure 138d-140d may be separated from each other. Each of the output structures 138a-140a, 138b-140b, 138c-140c and 138d-140d may have a similar implementation as the output structure 138-140 described in association with FIG. 3.

The output structure 138a-140a may provide the output waveguide feeding 146a. The output structure 138b-140b may provide the output waveguide feeding 146b. The output structure 138c-140c may provide the output waveguide feeding 146c. The output structure 138d-140d may provide the output waveguide feeding 146d. Each of the output waveguide feedings 146a-146d may have a similar implementation as the waveguide feeding 146 described in association with FIG. 3. Generally, the output waveguide feedings 146a-146d may each comprise a horn antenna aperture. In the example shown, the horn antenna aperture is not shown for clarity.

The input waveguide feeding 144 may provide a single input for the waveguide network 130'-132'. The output waveguide feedings 146a-146d may provide four outputs for the waveguide network 130'-132'. For example, the waveguide network 130'-132' implemented by the apparatus 100' may provide a single input, multi-output antenna array. The single input, multi-output antenna array may provide a 1 by 4 waveguide network.

Figure 9:
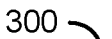
FIG. 9 is a diagram illustrating a top down view of an example embodiment of a 1 by 4 waveguide network.
Figure 9:
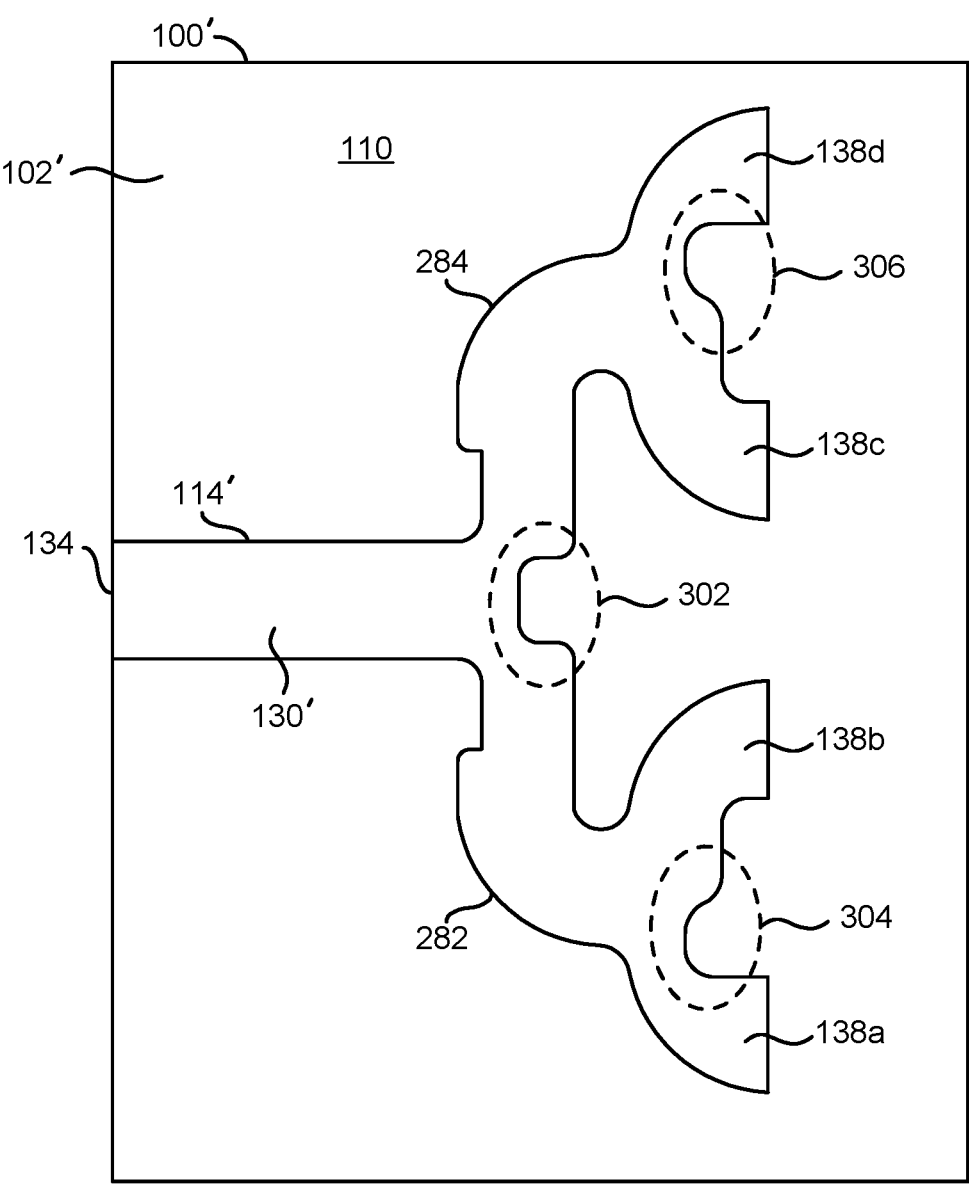

Referring to FIG. 9, a diagram illustrating a top down view of an example embodiment of a 1 by 4 waveguide network is shown. A top down view 300 of the apparatus 100' is shown. The top down view 300 may provide an alternate view to the three dimensional view 280 shown in association with FIG. 8. In the example shown, the apparatus 100' in the top down view 300 may comprise a 1 by 4 antenna array.

In the top down view 300 shown, the first portion 102' is shown (e.g., the second portion 104' may be below the first portion 102' and hidden from view). The first waveguide portion 130' is shown. The first waveguide input 134 may provide a feed for the first waveguide portion 130'. The first half 110 of the two-layer waveguide board 110-112 may be implemented with the polymer material. The inner edges of the first waveguide portion 130' may comprise the metal-plated surface 114.

A dotted circle 302 is shown. The dotted circuit 302 may encircle a splitter structure implemented in the waveguide network 130'-132'. In the top down view 300, the splitter structure 302 may be shown in the first waveguide network portion 130', but may also extend through the second waveguide network portion 132'. The splitter structure 302 may be implemented where the waveguide network 130'-132' splits into the branch 282 and the branch 284.

The branch 282 may split the first waveguide portion 130' into two output waveguide feeds 146a-146b of the four output waveguide feeds 146a-146d. The branch 282 is shown splitting the first waveguide portion 130' off to the first output structure 138a and the first output structure 138b. A dotted circuit 304 is shown. The dotted circle 304 may encircle a splitter structure implemented in the branch 282. The splitter structure 304 may be implemented where the branch 282 splits into the first output structure 138a and the first output structure 138b. While the top down view 300 may show the first output structures 138a-138b, the splitter structure 304 may also extend through and split the second output structures 140a-140b. For example, the splitter structure 304 may be implemented between the output waveguide feeds 146a-146b.

The branch 284 may split the first waveguide portion 130' into two output waveguide feeds 146c-146d of the four output waveguide feeds 146a-146d. The branch 284 is shown splitting the first waveguide portion 130' off to the first output structure 138c and the first output structure 138d. A dotted circuit 306 is shown. The dotted circle 306 may encircle a splitter structure implemented in the branch 284. The splitter structure 306 may be implemented where the branch 284 splits into the first output structure 138c and the first output structure 138d. While the top down view 300 may show the first output structures 138c-138d, the splitter structure 306 may also extend through and split the second output structures 140c-140d. For example, the splitter structure 306 may be implemented between the output waveguide feeds 146c-146d.

The waveguide splitter structures 302-306 may implemented in particular locations and with particular shapes. The design of the shape of the splitter structures 302-306 may be specific to the location. For example, the splitter 302 may have a generally symmetrical shape between the branches 282-284. In another example, the splitters 304-306 may have a deeper carve out on a side of the branches 282-284 that is closer to the outer output (e.g., the output waveguide feed 146a and the output waveguide feed 146d). In the example shown, the splitter structures 302-306 may be symmetrical (e.g., mirrored) about the middle of the waveguide portions 130'-132'. The shape and/or location of the splitters 302-306 may enable a desired phase and amplitude for each radiation element (e.g., the horn antenna, not shown). Selecting the desired phase and/or amplitude may enable the antenna array to operate with a desired radiation pattern and low sidelobe. The waveguide network 130'-132' may provide flexibility to enable reshape the pattern and/or of antenna layout the array for different radar applications.

Figure 10:
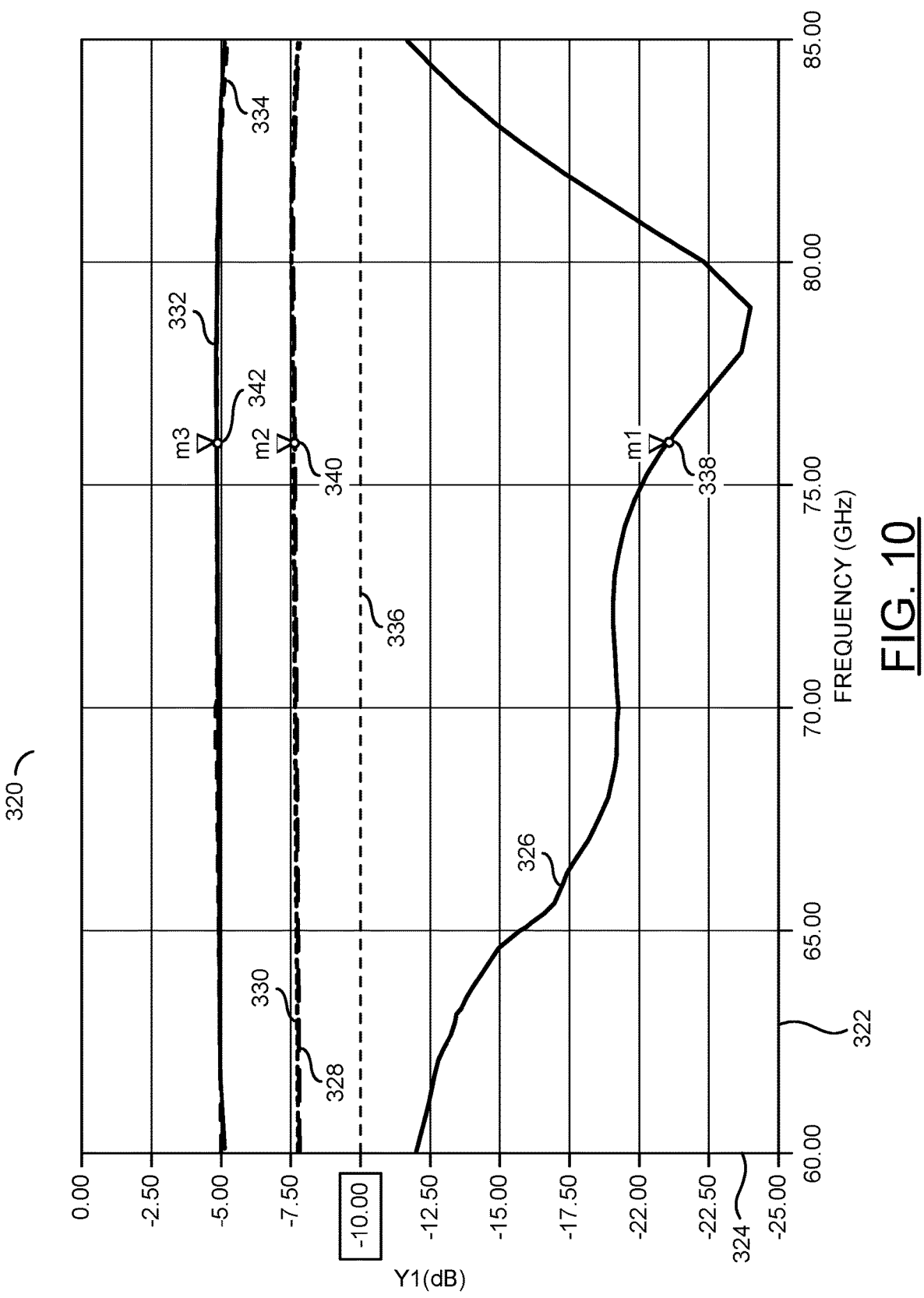
FIG. 10 is a diagram illustrating an insertion loss and reflection coefficient plot for a 1 by 4 waveguide network.

Referring to FIG. 10, a diagram illustrating an insertion loss and reflection coefficient plot for a 1 by 4 waveguide network is shown. A graph 320 is shown. The graph 320 may illustrate a reflection coefficient response for a 1 by 4 antenna array. In an example, the graph 320 may correspond to the apparatus 100' shown in association with FIGS. 8-9.

The graph 320 may comprise an axis 322 and an axis 324. The axis 322 may comprise an x-axis. The axis 324 may comprise a y-axis. The x-axis 322 may be a measure of frequency. In the example shown, the x-axis 322 may comprise a range of frequency from approximately 60 GHz to 85 GHZ. The y-axis 324 may be a measure of a reflection coefficient. In the example shown, the y-axis 324 may comprise a range of reflection coefficients from approximately −25 dB to 0 dB. In an example, the reflection may provide a relationship between the RF wave at the output waveguide feedings 146a-146d and the waveguide input feeding 144.

A line 326 is shown on the graph 320. The line 326 may be a reflection coefficient plot of the RF wave that may propagate through the waveguide 130-132. Lines 328-330 are shown on the graph 320. The lines 328-330 may correspond to the insertion loss of the two outer outputs waveguide feeds (e.g., the output 146a and the output 146d as shown in association with FIG. 9). Lines 332-334 are shown on the graph 320. The lines 332-334 may correspond to the insertion loss of the two inner outputs waveguide feeds (e.g., the output 146b and the output 146c as shown in association with FIG. 9).

A dashed horizontal line 336 is shown. The dashed horizontal line 336 may comprise a reference line for a −10 dB reflection coefficient. In an example, −10 dB may be considered an operational range for the waveguide 130'-132'. Similar to the reference line 228 described in association with FIG. 6, the reference line 336 may define where the apparatus 100' is considered operational. The operational range for the apparatus 100' may be varied according to the design criteria of a particular implementation.

The reflection coefficient 326 may be below the −10 dB reference line 336 at all the frequencies shown. The insertion losses 328-334 may each be above the −10 dB reference line 336 for all of the frequencies shown. The insertion losses 328-330 (e.g., corresponding to the outer output 146a and the outer output 146d) may be approximately 3 dB lower than the insertion losses 332-334 (e.g., corresponding to the inner output 146b and the inner output 146c) for all of the frequencies shown.

A point 338 is shown on the reflection coefficient plot 326. A point 340 is shown on the insertion loss plot 328 (e.g., the insertion loss 328 may be similar to the insertion loss 330). A point 342 is shown on the insertion loss plot 332 (e.g., the insertion loss 332 may be similar to the insertion loss 334). The point 338 on the reflection coefficient 326 may correspond to −76 GHz on the x-axis 322 and approximately −21.0374 dB on the y-axis 324. The point 340 on the insertion loss plot 328 may correspond to −76 GHz on the x-axis 322 and approximately −7.6983 dB on the y-axis 324. The point 342 on the insertion loss plot 332 may correspond to −76 GHz on the x-axis 322 and approximately −4.9021 dB on the y-axis 324. In the example shown, the 1 by 4 feed waveguide network 130'-132' may be capable of achieving at least a 25 GHZ bandwidth.

Figure 11:
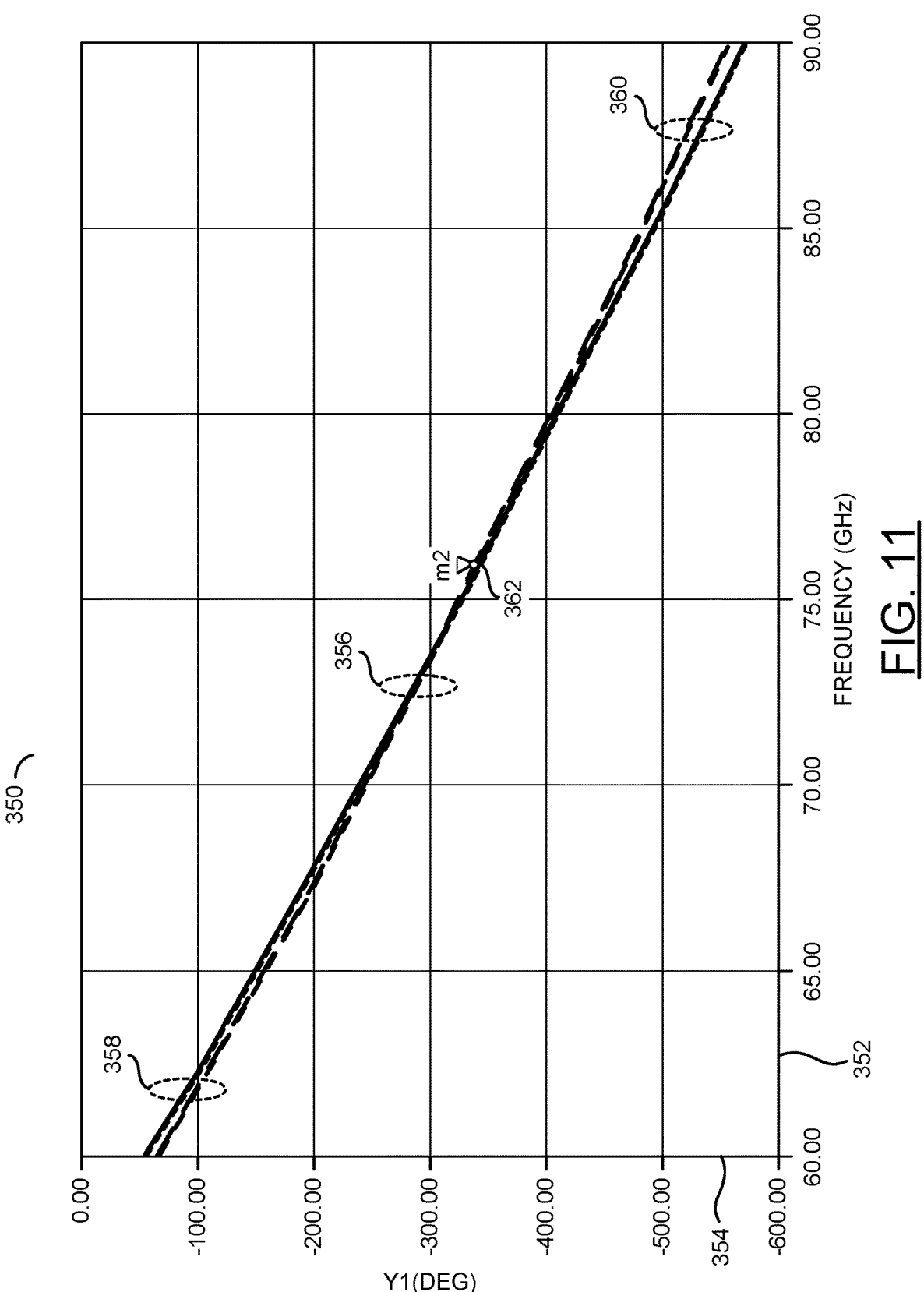
FIG. 11 is a diagram illustrating a phase plot for a 1 by 4 waveguide network.

Referring to FIG. 11, a diagram illustrating a phase plot for a 1 by 4 waveguide network is shown. A graph 350 is shown. The graph 350 may illustrate a phase for a 1 by 4 waveguide network. In an example, the graph 350 may correspond to the apparatus 100' shown in association with FIGS. 8-9.

The graph 350 may comprise an axis 352 and an axis 354. The axis 352 may comprise an x-axis. The axis 354 may comprise a y-axis. The x-axis 352 may be a frequency measured in GHz. In the example shown, the x-axis 352 may comprise a range frequency from approximately 60 GHz to 90 GHZ. The y-axis 354 may be a measure of phase measured in degrees. In the example shown, the y-axis 354 may comprise a range of phase from approximately −60.0 degrees to 0 degrees.

A group of lines 356 are shown on the graph 350. The group of lines 356 may represent the phase of the RF waves at the outputs 146a-146d of the apparatus 100'. Generally, the phase of each of the outputs 146a-146d may be nearly identical (e.g., equal) for all of the outputs 146a-146d. For example, a separation 358 of the group of lines 356 may occur near the lower end of the bandwidth range (e.g., near 60 GHz) and a separation 360 of the group of lines 356 may occur near the upper end of the bandwidth range (e.g., near 85 GHZ). A point 362 is shown. The point 362 may be representative of a value on any one of the responses in the group of lines 356 (e.g., any of the outputs 146a-146d). The point 362 may be approximately −341.0649 degrees at 76 GHz.

Figure 12:
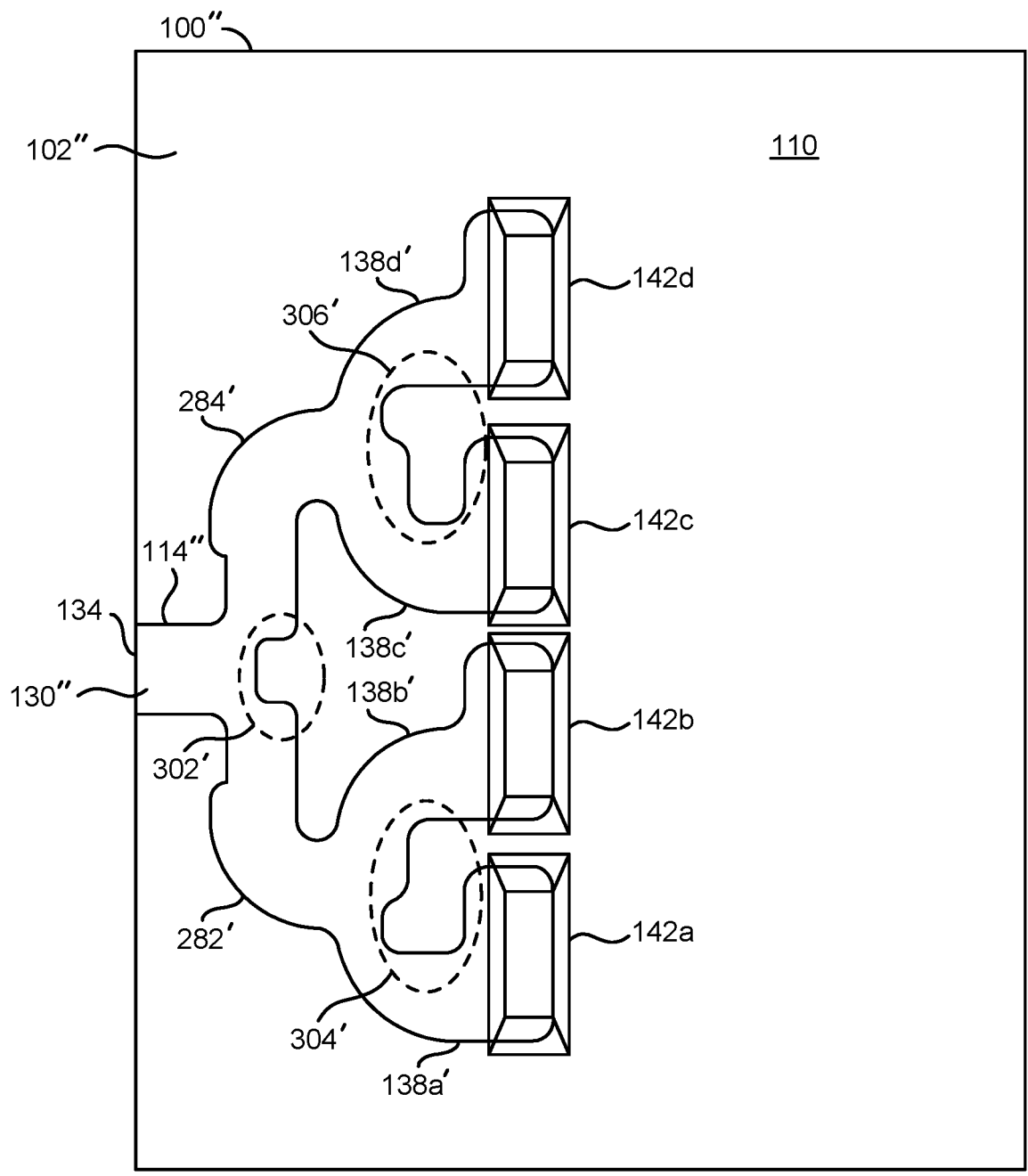
FIG. 12 is a diagram illustrating a top down view of horn antennas implemented with a short range detection network.

Referring to FIG. 12, a diagram illustrating a top down view of horn antennas implemented with a short range detection network is shown. A top down view 380 of the apparatus 100" is shown. The top down view 380 may provide a view of a short range detection network. The top down view 380 may be similar to the top down view 300 shown in association with FIG. 9. In the example shown, the apparatus 100" in the top down view 380 may comprise a short range 1 by 4 antenna array. The short range 1 by 4 antenna array may have the same phase and taper amplitude for the elements from the 1 by 4 feeding network.

In the top down view 380 shown, the first portion 102" is shown (e.g., the second portion 104" may be below the first portion 102" and hidden from view). The first waveguide portion 130" is shown. The first waveguide input 134 may provide a feed for the first waveguide portion 130". The first half 110 of the two-layer waveguide board 110-112 may be implemented with the polymer material. The inner edges of the first waveguide portion 130" may comprise the metal-plated surface 114.

The splitter structure 302' is shown implemented between the branches 282'-284'. A distance from the first waveguide input 134 and the splitter structure 302' may be a shorter distance than the distance from the first waveguide input and the splitter structure 302 in the apparatus 100' shown in association with FIG. 9. The shapes of the inner output structures 138b'-138c' may provide a more enclosed space around the splitter structure 302' than in the apparatus 100' shown in association with FIG. 9.

The branch 282' may split the first waveguide portion 130" into two output waveguide feeds 146a-146b of the four output waveguide feeds 146a-146d. The branch 282' is shown splitting the first waveguide portion 130" off to the first output structure 138a' and the first output structure 138b'. The splitter structure 304' is shown in between the first output structures 138a'-138b'. The shapes of the first output structures 138a'-138b' may provide a more enclosed space around the splitter structure 304' than in the apparatus 100' shown in association with FIG. 9. Horn antenna apertures 142a-142b are shown implemented on the first output structures 138a'-138b', respectively. The horn antenna apertures 142a-142b may be implemented on the first portions 102".

The branch 284' may split the first waveguide portion 130" into two output waveguide feeds 146c-146d of the four output waveguide feeds 146a-146d. The branch 284' is shown splitting the first waveguide portion 130" off to the first output structure 138c' and the first output structure 138d'. The splitter structure 306' is shown in between the first output structures 138c'-138d'. The shapes of the first output structures 138c'-138d' may provide a more enclosed space around the splitter structure 306' than in the apparatus 100' shown in association with FIG. 9. Horn antenna apertures 142c-142d are shown implemented on the first output structures 138c'-138d', respectively. The horn antenna apertures 142c-142d may be implemented on the first portions 102".

The shape of the splitter structure 304' may be different than the shape of the splitter structure 306'. In the example shown, the splitter structures 304'-306' may not be symmetrical to each other (e.g., not mirror images about the first waveguide input 134). The design of the splitter structures 304'-306' may be configured such that the output at the middle output structures 138b'-138c' may have the highest amplitude compared to the output at the outer output structures (e.g., the output structure 138a' and the outer output structure 138d'). The particular shapes of the splitter structures implemented to achieve the high gain at the middle two output structures 138b'-138c' may be varied according to the design criteria of a particular implementation.

Figure 13:
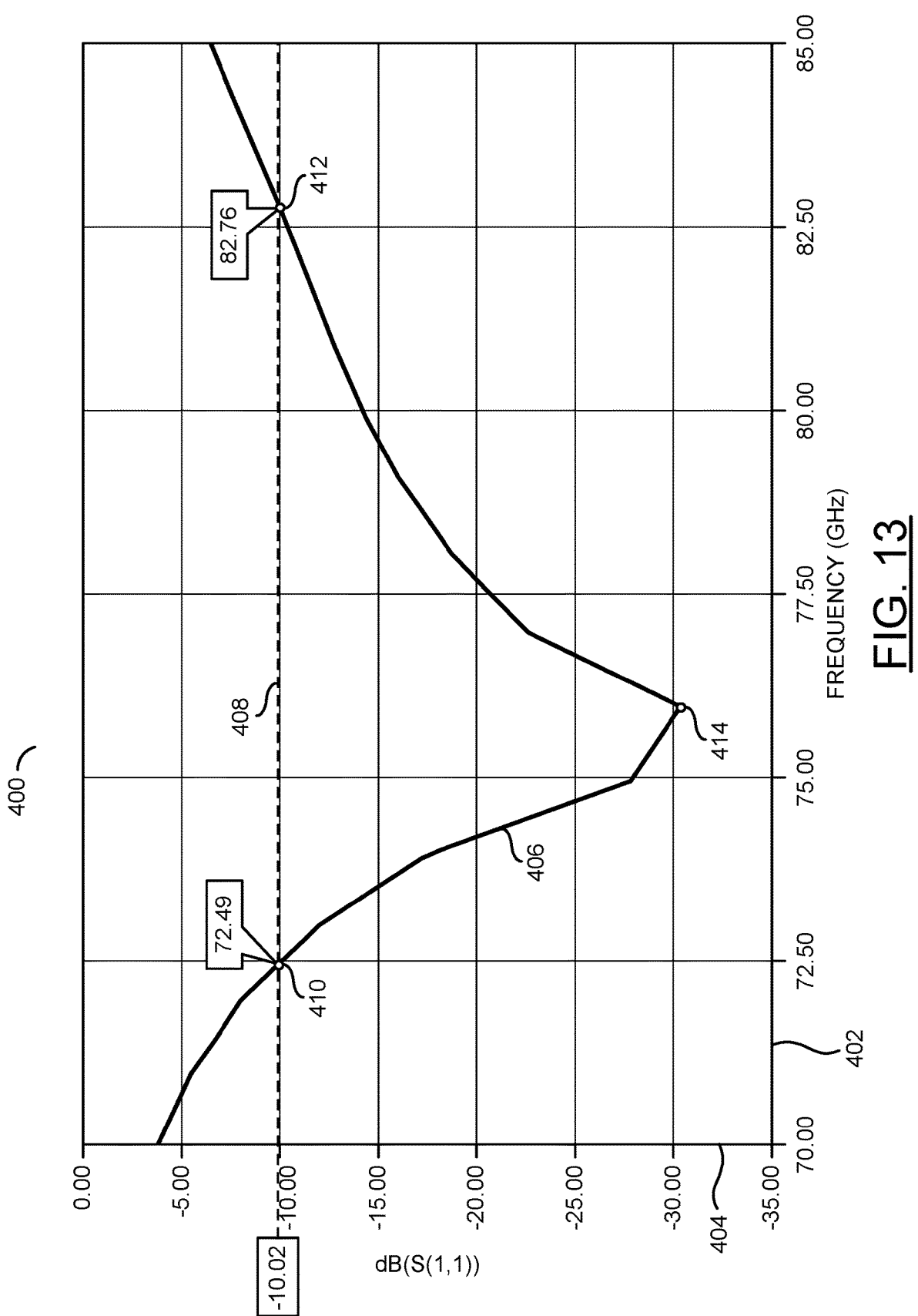
FIG. 13 is a diagram illustrating a reflection coefficient plot for the short range detection network.

Referring to FIG. 13, a diagram illustrating a reflection coefficient plot for the short range detection network is shown. A graph 400 is shown. The graph 400 may illustrate a reflection coefficient response for a short range 1 by 4 detection network. In an example, the graph 400 may correspond to the apparatus 100" shown in association with FIG. 12.

The graph 400 may comprise an axis 402 and an axis 404. The axis 402 may comprise an x-axis. The axis 404 may comprise a y-axis. The x-axis 402 may be a measure of frequency in GHZ. In the example shown, the x-axis 402 may comprise a range of frequency from approximately 70 GHz to 85 GHz. The y-axis 404 may be a measure of a reflection coefficient in dB. In the example shown, the y-axis 404 may comprise a range of reflection coefficients from approximately −35 dB to 0 dB. In an example, the reflection coefficient may provide a relationship between the RF wave at the horn antenna apertures 142a-142d and the waveguide feeding 144.

A line 406 is shown on the graph 400. The line 406 may be a reflection coefficient response of the RF wave that may propagate through the waveguide 130"-132". A dashed horizontal line 408 is shown. The dashed horizontal line 408 may comprise a reference line for a −10 dB reflection coefficient. Similar to the reference line 228 described in association with FIG. 6, the reference line 408 may define where the apparatus 100" is considered operational. In an example, −10 dB may be considered an operational range for the waveguide 130"-132". The operational range for the apparatus 100" may be varied according to the design criteria of a particular implementation.

A point 410, a point 412 and a point 414 are shown on the reflection coefficient response 406. The point 410 and the point 412 may comprise points on the reflection coefficient response 406 that cross the −10 dB reference line 408. The point 414 may comprise a point on the reflection coefficient response 406 that is below the −10 dB reference line 408.

The point 410 may correspond to −10 dB on the y-axis 404 and approximately 72.49 GHz on the x-axis 402. The reflection coefficient response 406 may be above the −10 dB reference line 408 at frequencies below 72.49 GHZ. The point 412 may correspond to −10 dB on the y-axis 404 and approximately 82.76 GHz on the x-axis 402. The reflection coefficient response 406 may be above the −10 dB reference line 408 at frequencies above 82.76 GHZ. The reflection coefficient response 406 may be below the −10 dB reference line 408 in between the points 410-412. In an example, at the point 414, the reflection coefficient may be approximately −30.3836 dB at a frequency of 76 GHZ. In the example shown, the difference between the point 410 and the point 412 may be 10.27 GHZ. For example, the short range 1 by 4 detection network embodiment of the apparatus 100" may provide a bandwidth of approximately 10 GHz.

Figure 14:
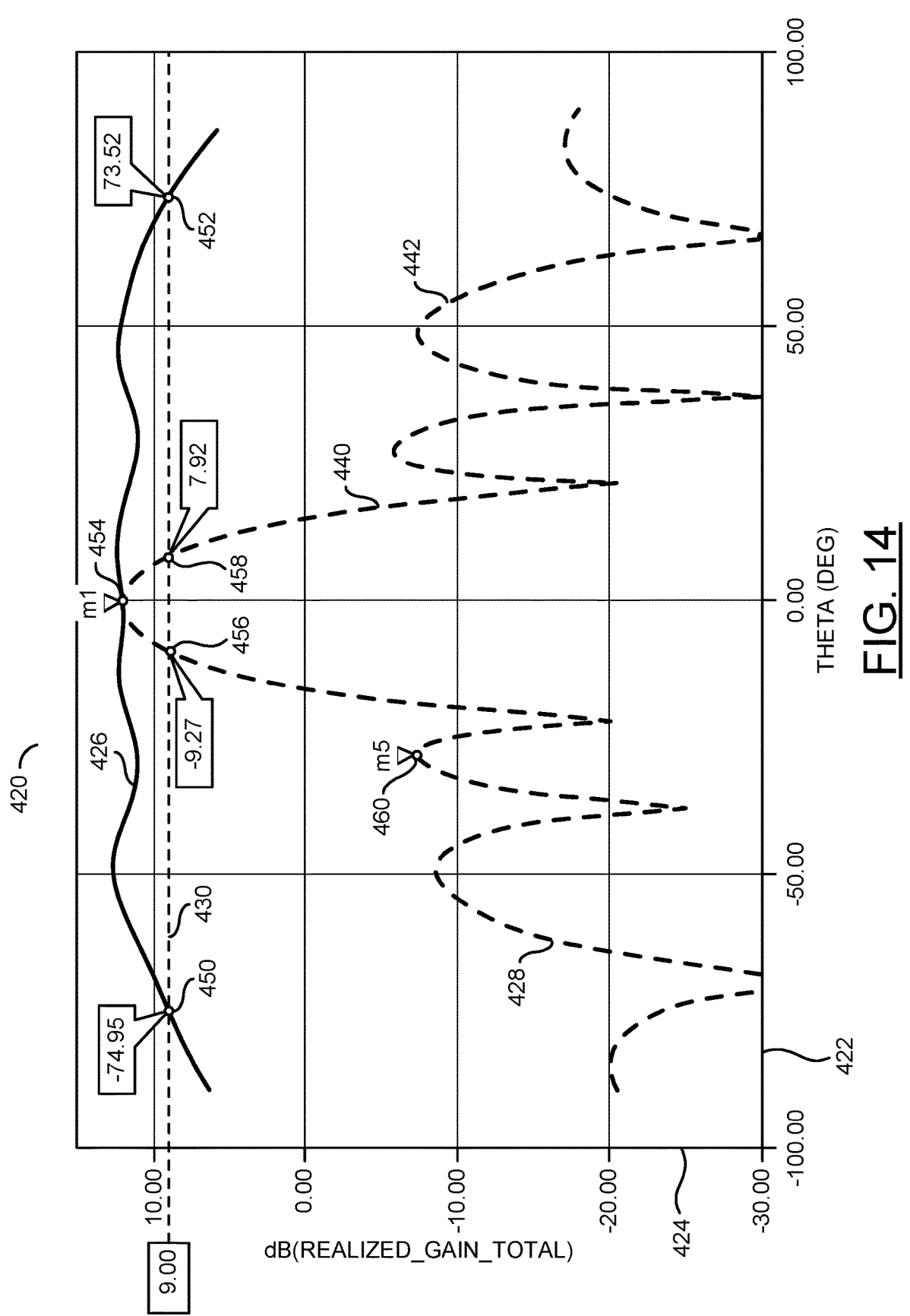
FIG. 14 is a diagram illustrating a radiation pattern plot for the short range detection network.

Referring to FIG. 14, a diagram illustrating a radiation pattern plot for the short range detection network is shown. A graph 420 is shown. The graph 420 may illustrate a radiation pattern for a short range 1 by 4 detection network. In an example, the graph 420 may correspond to the apparatus 100" shown in association with FIG. 12.

The graph 420 may comprise an axis 422 and an axis 424. The axis 422 may comprise an x-axis. The axis 424 may comprise a y-axis. The x-axis 422 may be an angle measured in degrees. In the example shown, the x-axis 422 may comprise a range of degrees from approximately −100 degrees to 100 degrees. The y-axis 424 may be a measure of realized total gain measured in decibels. In the example shown, the y-axis 424 may comprise a range of realized total gain from approximately −30 dB to 15 dB. In an example, the gain may provide a relationship between the RF wave at the waveguide output feedings 146a-146d and the waveguide input feeding 144.

A line 426, a dotted line 428, and a dotted line 430 are shown on the graph 420. The line 426 may be a gain response at 76 GHz with a phi value of 90 degrees (e.g., the elevation plane). The dotted line 428 may be a gain response at 76 GHz with a phi value of 0 degrees (e.g., the azimuth plane). The lines 426-428 may illustrate an electric field pattern (e.g., an E-field radiation pattern). The line 430 may be a reference line. The reference line 430 may represent a gain of 9 dB.

A main lobe 440 and side lobes 442 of the gain response 428 are shown. The main lobe 440 may extend above the 9 dB reference line 430 near 0 degrees. The side lobes 442 may comprise three additional lobes to the main lobe 440. The side lobes 442 may comprise nulls at approximately −20 degrees and +20 degrees, −40 degrees and 40 degrees and −70 degrees and +70 degrees. The gain response 428 may be generally symmetrical about the 0 degree point of the x-axis 422.

A point 450 and a point 452 are shown on the gain response 426. The point 450 may comprise a realized gain value at the 9 dB reference line 430 at approximately −75.95 degrees. The point 452 may comprise a realized gain value at the 9 dB reference line 430 at approximately 73.52 degrees. The radiation pattern of the short range 1 by 4 detection network implemented by the apparatus 100" may be wide (e.g., a 3 dB bandwidth from approximately −75 degrees to 75 degree). For example, the apparatus 100" may provide a short range radar with wide bandwidth and wide field of view.

A point 454, a point 456, a point 458 and a point 460 are shown on the gain response 428. The point 454 may comprise a realized gain value of 12.0383 at an angle of 0 degrees. The points 456-458 may be locations on the main lobe 440 that cross the 9 dB reference line 430. The point 456 may be at 9 dB at approximately −9.27 degrees. The point 458 may be at 9 dB at approximately 7.92 degrees. The point 460 may be a location of one of the peaks of the side lobe 442. The point 460 may have a gain of approximately −7.2370 dB at approximately −28.0 degrees. Since the radiation pattern may be symmetrical, the side lobe 442 may also have a gain of approximately 7.2370 dB at approximately 28.0 degrees. The side lobe level (e.g., from the peak of the side lobe 442 to the peak of the main lobe 440) may be approximately 19.2743 dB.

Figure 15:
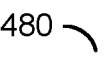
FIG. 15 is a diagram illustrating a top down view of an example embodiment of a 2 by 8 waveguide network.
Figure 15:
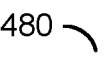

Referring to FIG. 15, a diagram illustrating a top down view of an example embodiment of a 2 by 8 waveguide network is shown. A top down view 480 of the apparatus 100''' is shown. The top down view 480 may provide a view of a 2 by 8 waveguide network. In the example shown, the apparatus 100''' in the top down view 480 may comprise a long range 2 by 8 antenna array.

In the top down view 480 shown, the first portion 102''' is shown (e.g., the second portion 104''' may be below the first portion 102''' and hidden from view). The first waveguide portion 130''' is shown. The first waveguide input 134 may provide a feed for the first waveguide portion 130'''. The first half 110 of the two-layer waveguide board 110-112 may be implemented with the polymer material. The inner edges of the first waveguide portion 130''' may comprise the metal-plated surface 114.

A splitter structure 482 is shown near the first waveguide input 134. The splitter structure 482 may be implemented at a location where the first waveguide portion 130''' (and the second waveguide portion 132''') divides into two main branches 484a-484b. The shape and/or location of the splitter structure 482 may enable a desired phase and amplitude for each radiation element in the 2 by 8 waveguide network 130'''-132'''.

The main branch 484a may extend along a first side of the apparatus 100''' (e.g., a left side, in the example shown). The main branch 484b may extend along a second side of the apparatus 100''' (e.g., a right side, in the example shown). The apparatus 100''' may be implemented with a symmetrical design with respect to the left and right side. The main branch 484a may lead to one symmetrical portion of the apparatus 100''' and the main branch 484b may lead to another symmetrical portion of the apparatus 100'''. For example, the main branches 484a-484b may split the waveguide network 130'''-132''' into the two portions of the 2 by 8 architecture.

The main branch 484a may be divided into an arm 486a and an arm 488a. A splitter structure 490a may be implemented at the location where the main branch 484a splits off into the arms 486a-488a. Similarly (e.g., with a symmetrical design), the main branch 484b may be divided into an arm 486b and an arm 488b. A splitter structure 490b may be implemented at the location where the main branch 484b splits off into the arms 486b-488b. The shape and/or location of the splitter structures 490a-490b may enable a desired phase and amplitude for each radiation element in the waveguide network 130'''-132'''.

The arm 486a may be configured to extend the first waveguide portion 130''' into a radiation element portion 492a. The arm 488a may be configured to extend the first waveguide portion 130''' into the radiation element portion 492b. The arm 486b may be configured to extend the first waveguide portion 130''' into the radiation element portion 492c. The arm 488b may be configured to extend the first waveguide portion 130''' into the radiation element portion 492d. The main branches 484a-484b may be configured to split off into the arms 486a-486b and the arms 488a-488b such that the radiation element portions 492a-492b are facing the radiation element portions 492c-492d. For example, the apparatus 100''' may be designed to be symmetrical about the radiation element portions 492a-492b and the radiation element portions 492c-492d.

Each of the radiation element portions 492a-492d may comprise a 1 by 4 antenna array. In an example, each of the radiation element portions 492a-492d may have an implementation similar to, but not identical to, the waveguide network 130"-132' 'shown in association with FIG. 12. For example, the radiation element portions 492a-492d may have a different amplitude distribution among the four output structures 138a'-138d' than the waveguide network 130"-132" shown in association with FIG. 12. For example, the arm 486a may be an input waveguide feed for the radiation element portion 492a, and the radiation element portion 492a may comprise the branches 282'-284', with the splitter structure 302' that divides into the four output structures 138a'-138d' (e.g., with a splitter structure 494a that divides the outer output element 138a' from the inner output element 138b' and the splitter structure 494a that divides the other outer output element 138d' from the other inner output element 138c') each having a respective one of the horn antenna apertures 142a-142d. Similarly, the arm 488a may be the input waveguide feed for the radiation element portion 492b (e.g., implementing the splitter structures 494a), the arm 486b may be the input waveguide feed for the radiation element portion 492c (e.g., implementing splitter structures 494b), and the arm 488b may be the input waveguide feed for the radiation element portion 492d (e.g., implementing splitter structures 494b).

The four output structures 138a'-138d' (and the respective horn antenna apertures 142a-142d) of the radiation element portion 492a and the four output structures 138a'-138d' (and the respective horn antenna apertures 142a-142d) of the radiation element portion 492b may be aligned along a length of the apparatus 100'''. The output structures of the radiation element portions 492a-492b may provide a 1 by 8 architecture (e.g., half of the 2 by 8 architecture). The four output structures 138a'-138d' (and the respective horn antenna apertures 142a-142d) of the radiation element portion 492c and the four output structures 138a'-138d' (and the respective horn antenna apertures 142a-142d) of the radiation element portion 492d may be aligned along a length of the apparatus 100'''. The output structures of the radiation element portions 492a-492b may provide a 1 by 8 architecture (e.g., half of the 2 by 8 architecture).

The four output structures 138a'-138d' (and the respective horn antenna apertures 142a-142d) of the radiation element portion 492a and the four output structures 138a'-138d' (and the respective horn antenna apertures 142a-142d) of the radiation element portion 492c may be facing each other (e.g., in a symmetrical orientation with respect to the waveguide input feed 134). The four output structures 138a'-138d' (and the respective horn antenna apertures 142a-142d) of the radiation element portion 492b and the four output structures 138a'-138d' (and the respective horn antenna apertures 142a-142d) of the radiation element portion 492d may be facing each other (e.g., in a symmetrical orientation with respect to the waveguide input feed 134). Together, the radiation element portions 492a-492d may provide the output elements in a 2 by 8 arrangement configured for long range detection.

A middle group of radiation elements 496 are shown. The middle group of radiation elements 496 may comprise a center-most one of the output structures 138a'-138d' from each of the radiation element portions 492a-492d. For example, the output structure 138a' may be the innermost radiation element from each of the radiation element portions 492a-492d. The apparatus 100''' may be designed such that the middle group of radiation elements 496 have the largest amplitude. The amplitude may gradually taper off for the radiation elements that are farther from the center. For example, the output structure 138a' (e.g., near the center) may have the highest amplitude, then the next closest output structure 138b', then the next closest output structure 138c' and then the farthest output structure 138d' may have the lowest amplitude. For example, the amplitude values of the antennas may gradually decrease based on a distance of each radiation element from the middle group of radiation elements 496.

In the example shown, the splitter structures 494a implemented in the radiation element portions 492a-492b may be identical and the splitter structures 494b implemented in the radiation element portions 492a-492b may be identical. The splitter structures 494a and the splitter structures 494b may be symmetrical (e.g., mirrored) about the waveguide feed input 134. The splitter structures 494a-494b may have a different shape than the splitter structures 304'-306' shown in association with FIG. 12 (e.g., the splitter structures 494a are not symmetrical, but instead are the same, while the splitter structures 494b are also the same as each other). The splitter structures 494a-494b may be configurable to enable a designer the flexibility to change the phase and amplitude of the radiation elements in order to shape the output RF pattern. For example, the polymer material of the two-layer waveguide board 110-112 and/or the shape of the metal plated surfaces 114-116 may be adjusted during the fabrication process in order to shape the output RF pattern. The splitter structures 494a-494b may be designed (e.g., shaped) such that the highest amplitude is achieved for the middle group of radiation elements 496.

Figure 16:
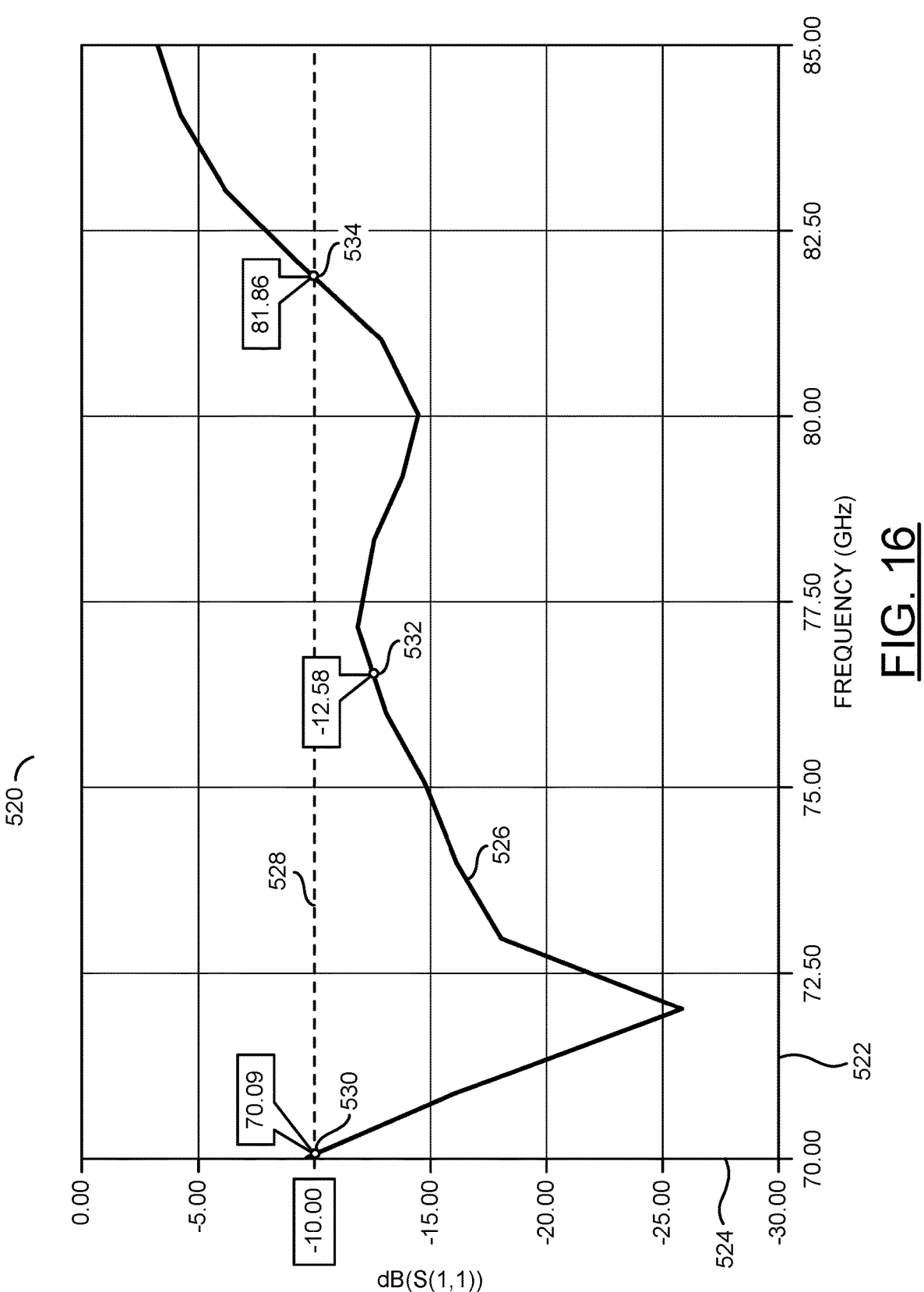
FIG. 16 is a diagram illustrating a reflection coefficient plot for a long range detection network.

Referring to FIG. 16, a diagram illustrating a reflection coefficient plot for a long range detection network is shown. A graph 520 is shown. The graph 520 may illustrate a reflection coefficient response for a long range 2 by 8 detection network. In an example, the graph 520 may correspond to the apparatus 100''' shown in association with FIG. 15.

The graph 520 may comprise an axis 522 and an axis 524. The axis 522 may comprise an x-axis. The axis 524 may comprise a y-axis. The x-axis 522 may be a measure of frequency in GHz. In the example shown, the x-axis 522 may comprise a range of frequency from approximately 70 GHz to 85 GHZ. The y-axis 524 may be a measure of reflection coefficient in dB. In the example shown, the y-axis 524 may comprise a range of reflection coefficient values from approximately −30 dB to 0 dB. In an example, the reflection coefficient may provide a relationship between the RF wave at the horn antenna apertures 142a-142d in each of the radiation element portions 492a-492d.

A line 526 is shown on the graph 520. The line 526 may be a reflection coefficient response of the RF wave that may propagate through the waveguide 130'''-132'''. A dashed horizontal line 528 is shown. The dashed horizontal line 528 may comprise a reference line for a −10 dB reflection coefficient. Similar to the reference line 228 described in association with FIG. 6, the reference line 528 may define where the apparatus 100''' is considered operational. In an example, −10 dB may be considered an operational range for the waveguide 130'''-132'''. The operational range for the apparatus 100''' may be varied according to the design criteria of a particular implementation.

A point 530, a point 532 and a point 534 are shown on the response 526. The point 530 and the point 534 may comprise points on the reflection coefficient response 526 that cross the −10 dB reference line 528. The point 532 may comprise a point on the reflection coefficient response 526 that is below the −10 dB reference line 528.

The point 530 may correspond to −10 dB on the y-axis 524 and approximately 70.09 GHz on the x-axis 522. The reflection coefficient response 526 may be above the −10 dB reference line 528 at frequencies below 70.09 GHZ. The point 534 may correspond to –10 dB on the y-axis 524 and approximately 81.86 GHz on the x-axis 522. The reflection coefficient response 526 may be above the –10 dB reference line 528 at frequencies above 81.86 GHZ. The reflection coefficient response 526 may be below the –10 dB reference line 528 in between the point 530 and the point 534. In an example, at the point 532, the reflection coefficient may be approximately –12.58 dB at a frequency of 76 GHZ. In the example shown, the difference between the point 530 and the point 534 may be 11.77 GHZ. For example, the long range 2 by 8 detection network embodiment of the apparatus 100''' may provide a bandwidth of approximately 10 GHz.

Figure 17:
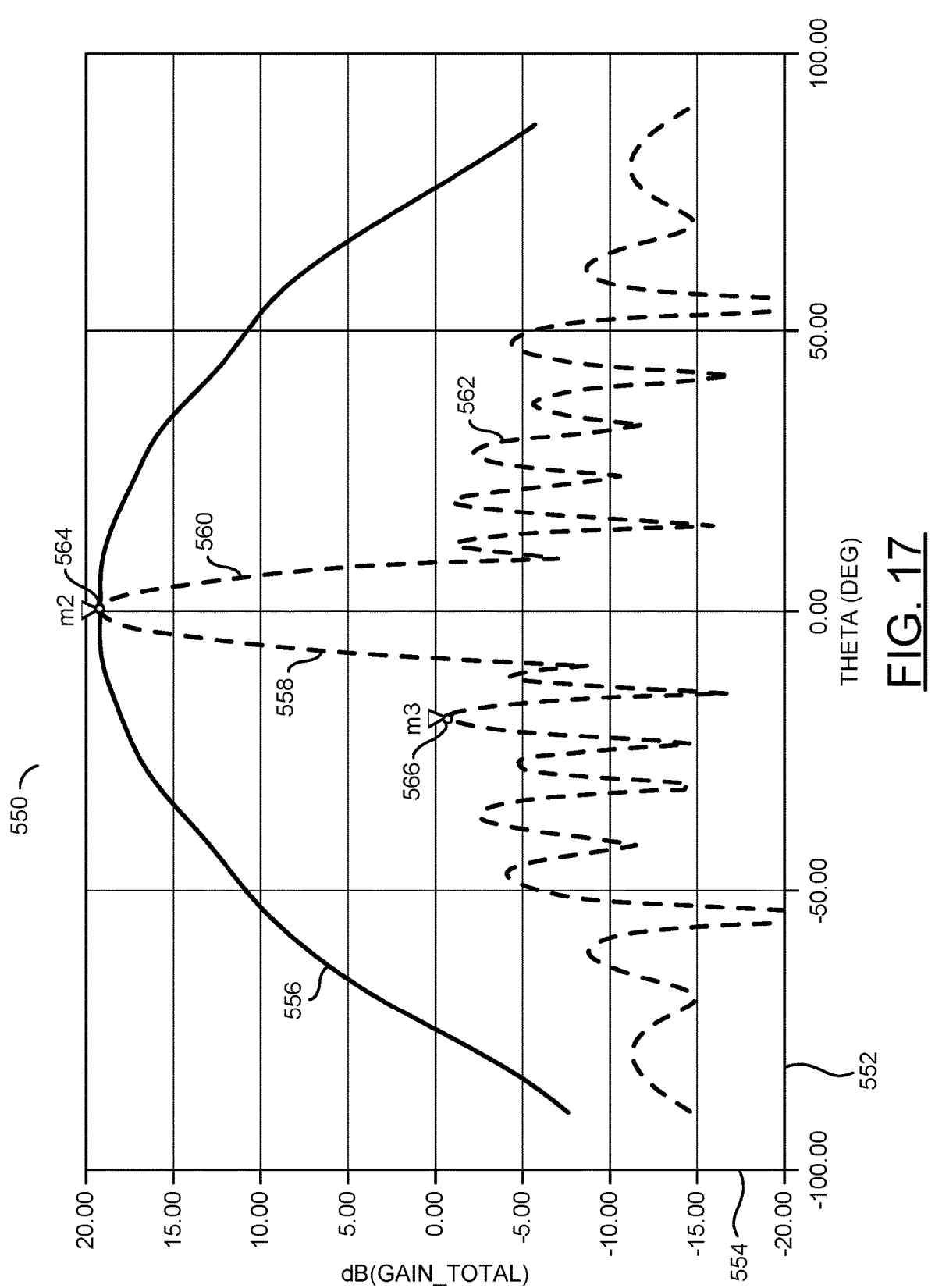
FIG. 17 is a diagram illustrating a radiation pattern plot for the long range detection network.

Referring to FIG. 17, a diagram illustrating a radiation pattern plot for the long range detection network is shown. A graph 550 is shown. The graph 550 may illustrate a radiation pattern for a long range 2 by 8 detection network. In an example, the graph 550 may correspond to the apparatus 100''' shown in association with FIG. 15.

The graph 550 may comprise an axis 552 and an axis 554. The axis 552 may comprise an x-axis. The axis 554 may comprise a y-axis. The x-axis 552 may be an angle measured in degrees. In the example shown, the x-axis 552 may comprise a range of degrees from approximately –100 degrees to 100 degrees. The y-axis 554 may be a measure of realized total gain measured in decibels. In the example shown, the y-axis 554 may comprise a range of realized total gain from approximately –20 dB to 20 dB. In an example, the gain may provide a relationship between the RF wave at the horn antenna apertures 142a-142d in each of the radiation element portions 492a-492d.

A line 556 and a dotted line 558 are shown on the graph 550. The line 556 may be a gain response at 76 GHz with a phi value of 0 degrees (e.g., the azimuth plane). The dotted line 558 may be a gain response at 76 GHz with a phi value of 90 degrees (e.g., the elevation plane). The lines 556-558 may illustrate an electric field pattern (e.g., an E-field radiation pattern).

A main lobe 560 and side lobes 562 of the gain response 558 are shown. The main lobe 560 may extend to a peak above 15 dB near 0 degrees. The side lobes 562 may comprise seven additional lobes to the main lobe 560. The side lobes 562 may comprise nulls at approximately –10 degrees and +10 degrees, –15 degrees and 15 degrees, –25 degrees and 25 degrees, –35 degrees and 35 degrees, –45 degrees and 45 degrees, –55 degrees and 55 degrees and –70 degrees and +70 degrees. The gain response 558 may be generally symmetrical about the 0 degree point of the x-axis 552.

A point 564 and a point 566 are shown on the gain response 558. The point 564 may be at a peak of the main lobe 560. The point 564 may comprise a realized gain value of approximately 19.1093 at 0 degrees. In an example, the peak of the main lobe 560 may represent a gain of the middle group of radiation elements 496. The point 566 may be a location of one of the peaks of the side lobe 562. The point 566 may comprise a realized gain value of –0.5710 dB at approximately –19.00 degrees. Since the radiation pattern may be symmetrical, the side lobe 562 may also have a gain of approximately –0.5710 dB at approximately 19.00 degrees. The side lobe level (e.g., from the peak of the side lobe 562 to the peak of the main lobe 560) may be approximately 19.6803 dB. The radiation pattern of the long range 2 by 8 detection network implemented by the apparatus 100''' may have a maximum gain of 19.1 dB with a –20 dB side lobe 562, which may be suitable for a long range radar that uses a narrow field of view with a directional high gain.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICS (application specific integrated circuits), Platform ASICS, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMS (erasable programmable ROMs), EEPROMS (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
a first waveguide portion comprising a first half of a waveguide input, a first half of waveguide outputs, a first half of a splitter structure, and a first layer of a two-layer waveguide board;
a second waveguide portion comprising a second half of said waveguide input, a second half of said waveguide outputs, a second half of said splitter structure, and a second layer of said two-layer waveguide board; and
an attachment configured to connect said first waveguide portion to said second waveguide portion, wherein
(i) said first half of said waveguide input and said first half of said splitter structure have a same height as said second half of said waveguide input and said second half of said splitter structure,
(ii) said two-layer waveguide board is configured to implement a waveguide network for an antenna array,
(iii) a horn antenna aperture for each antenna in said antenna array is implemented on said first waveguide portion,
(iv) said first half of said waveguide input and said second half of said waveguide input are configured to provide an input to said waveguide network, and
(v) said first half of said waveguide outputs and said second half of said waveguide outputs are configured to provide an output of said waveguide network that emits an electric field radiation pattern comprising (i) a symmetrical response in an elevation plane with a first gain that does not drop off until approximately −50 and +50 degrees, (ii) a wide and symmetrical response in an azimuth plane with a second gain that does not drop off until approximately −90 and +90 degrees, and (iii) an equal gain response at zero degrees in both said elevation plane and said azimuth plane.

2. The apparatus according to claim 1, wherein connecting said first waveguide portion to said second waveguide portion aligns said first half of said waveguide input and said second half of said waveguide input to form a rectangular waveguide input to said waveguide network.

3. The apparatus according to claim 1, wherein said first waveguide portion and said second waveguide portion are fabricated using plastic mold injection with surface plating.

4. The apparatus according to claim 1, wherein said attachment comprises at least one of a screw, a conductive glue or a non-conductive glue.

5. The apparatus according to claim 1, wherein said same height for said first waveguide portion and said second waveguide portion is implemented to limit a leakage of radio frequency (RF) energy.

6. The apparatus according to claim 1, further comprising an air gap in between said first waveguide portion and said second waveguide portion.

7. The apparatus according to claim 1, wherein said antenna array is configured to operate with a 10 GHZ ultra wide bandwidth.

8. The apparatus according to claim 1, wherein said waveguide network is configured to enable each antenna in said antenna array to achieve 13 GHz bandwidth and a 3 dB gain from −90 degrees to 90 degrees.

9. The apparatus according to claim 1, wherein (i) said splitter structure enables (a) said first half of said waveguide outputs to comprise a first half of four waveguide outputs, and (b) said second half of said waveguide outputs to comprise a second half of said four waveguide outputs and (ii) said waveguide network implements a 1 by 4 feed network.

10. The apparatus according to claim 1, wherein (i) said splitter structure enables (a) said first half of said waveguide outputs to comprise a first half of 16 waveguide outputs, and (b) said second half of said waveguide outputs to comprise a second half of said 16 waveguide outputs and (ii) said waveguide network implements a 2 by 8 feed network.

11. The apparatus according to claim 10, wherein (i) said 2 by 8 feed network comprises a plurality of splitter structures and (ii) said plurality of splitter structures are shaped to enable an amplitude distribution for said 16 waveguide outputs with a highest amplitude at a center-most of said 16 waveguide outputs and amplitude values that gradually decrease for each of said 16 waveguide outputs based on a distance from said center-most of said 16 waveguide outputs.

12. The apparatus according to claim 1, wherein said two-layer waveguide board is separated from a radar printed circuit board.

13. The apparatus according to claim 1, wherein said antenna array is configured to enable a radar sensor for a vehicle.

14. The apparatus according to claim 13, wherein said vehicle comprises a zone processor configured to receive input from said radar sensor and a plurality of inputs from other radar sensors, each configured to implement said apparatus.

15. The apparatus according to claim 1, wherein said waveguide network is configured as an air waveguide to compensate for radio frequency losses resulting from routing traces for said antenna array that enable a wide separation from each antenna in said antenna array.

16. The apparatus according to claim 1, wherein (i) said first half of said splitter structure and said second half of said splitter structure are configured to split said waveguide network from said first half of said waveguide input and said second half of said waveguide input into a plurality of branches each configured to extend to each of said first half of said waveguide outputs and said second half of said waveguide outputs and (ii) said splitter structure is configured to provide a symmetrical design for said plurality of branches about said first half of said waveguide outputs and said second half of said waveguide outputs.

17. The apparatus according to claim 16, wherein a shape of said first half of said splitter structure and said second half of said splitter structure are implemented with said same height and a specific shape to enable said plurality of branches to comprise an equal distance from said first half of said waveguide input and said second half of said waveguide input to each of said first half of said waveguide outputs and said second half of said waveguide outputs.

18. An apparatus comprising:

a first waveguide portion comprising a first half of a waveguide input, a first half of four waveguide outputs and a first layer of a two-layer waveguide board;

a second waveguide portion comprising a second half of said waveguide input, a second half of said four waveguide outputs and a second layer of said two-layer waveguide board; and an attachment configured to connect said first waveguide portion to said second waveguide portion, wherein (i) said first half of said waveguide input has a same height as said second half of said waveguide input, (ii) said two-layer waveguide board is configured to implement a waveguide network that implements a 1 by 4 feed network configured to achieve 25 GHz bandwidth for an antenna array, (iii) a horn antenna aperture for each antenna in said antenna array is implemented on said first waveguide portion, (iv) said first half of said waveguide input and said second half of said waveguide input are configured to provide 18 an input to said waveguide network, (v) two of said four waveguide outputs on an outside of said 1 by 4 feed network provide an amplitude of a radio frequency signal that is 2.8 dB lower than said amplitude of said radio frequency signal of two of said four waveguide outputs on an inside of said 1 by 4 feed network, and (vi) a phrase of each of said four waveguide outputs is equal.

19. An apparatus comprising:

a first waveguide portion comprising a first half of a waveguide input, a first half of 16 waveguide outputs and a first layer of a two-layer waveguide board;

a second waveguide portion comprising a second half of said waveguide input, a second half of said 16 waveguide outputs and a second layer of said two-layer waveguide board; and an attachment configured to connect said first waveguide portion to said second waveguide portion, wherein (i) said first half of said waveguide input has a same height as said second half of said waveguide input, (ii) said two-layer waveguide board is configured to implement a waveguide network that implements a 2 by 8 feed network for an antenna array, and (iii) a horn antenna aperture for each antenna in said antenna array is implemented on said first waveguide portion, (iv) said first half of said waveguide input and said second half of said waveguide input are configured to provide an input to said waveguide network, and (v) said 2 by 8 feed network is configured to enable said antenna array to implement a long range radar with a narrow field of view configured to achieve 10 GHz bandwidth, a maximum gain of 19.1 dB and a −20 dB side lobe.

* * * * *